(12) United States Patent
Suzuki

(10) Patent No.: US 9,088,053 B2
(45) Date of Patent: Jul. 21, 2015

(54) COMPARATOR CIRCUIT, SEMICONDUCTOR DEVICE, BATTERY MONITORING SYSTEM, CHARGING PROHIBITION METHOD, AND COMPUTER-READABLE MEDIUM THAT DETECTS BATTERY VOLTAGES LOWER THAN A LOWEST OPERATIONAL POWER SUPPLY VOLTAGE

(75) Inventor: Koji Suzuki, Miyazaki (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 438 days.

(21) Appl. No.: 13/459,452

(22) Filed: Apr. 30, 2012

(65) Prior Publication Data
US 2012/0293125 A1    Nov. 22, 2012

(30) Foreign Application Priority Data

May 16, 2011    (JP) .................................. 2011-109613

(51) Int. Cl.
| | | |
|---|---|---|
| H02J 7/00 | (2006.01) | |
| H01M 10/44 | (2006.01) | |
| H01M 10/48 | (2006.01) | |

(52) U.S. Cl.
CPC .......... *H01M 10/441* (2013.01); *H01M 10/482* (2013.01); *H02J 7/0014* (2013.01); *Y02T 10/7055* (2013.01)

(58) Field of Classification Search
CPC ..... H02J 7/0021; H02J 7/0026; H02J 7/0031; H02J 2007/004
USPC .......................... 320/116, 118, 134, 135, 136
See application file for complete search history.

(56) References Cited

U.S. PATENT DOCUMENTS

| | | | | |
|---|---|---|---|---|
| 5,637,981 A * | 6/1997 | Nagai et al. | ................... | 320/160 |
| 6,320,355 B1 * | 11/2001 | Terada | .......................... | 320/136 |
| 6,396,246 B2 * | 5/2002 | Haraguchi et al. | ............ | 320/134 |
| 6,452,362 B1 * | 9/2002 | Choo | ............................. | 320/116 |
| 6,891,352 B2 * | 5/2005 | Miyazaki et al. | ............. | 320/118 |
| 6,914,416 B2 * | 7/2005 | Thomas et al. | ................ | 320/136 |
| 7,091,695 B2 * | 8/2006 | Miyazaki et al. | ............. | 320/116 |
| 7,215,096 B2 * | 5/2007 | Miura et al. | ................... | 320/134 |
| 7,423,410 B2 * | 9/2008 | Yoshio | .......................... | 320/134 |
| 7,521,896 B2 * | 4/2009 | Yudahira et al. | .............. | 320/133 |

(Continued)

FOREIGN PATENT DOCUMENTS

| | | |
|---|---|---|
| JP | 11-155241 | 6/1999 |
| JP | 2008191137 A | 8/2008 |

(Continued)

OTHER PUBLICATIONS

Japanese Office Action with Translation dated Mar. 3, 2015.

*Primary Examiner* — Helen Rossoshek
(74) *Attorney, Agent, or Firm* — Volentine & Whitt, PLLC

(57) ABSTRACT

A comparator circuit includes: a switching element that is disposed between a positive electrode of a battery cell and a fixed potential supply source, that has a control terminal connected to a negative electrode of the battery cell, and that operates in response to a voltage applied from the battery cell to the control terminal; a voltage regulating unit that is disposed between the battery cell and the switching element and that regulates the voltage applied from the battery cell to the switching element; and an output signal line that outputs a potential between the switching element and the fixed potential supply source.

13 Claims, 13 Drawing Sheets

(56) References Cited

U.S. PATENT DOCUMENTS

| | | | |
|---|---|---|---|
| 7,567,116 B2 * | 7/2009 | Yoshio | 327/535 |
| 7,605,568 B2 * | 10/2009 | Gangstoe et al. | 320/137 |
| 7,612,530 B2 * | 11/2009 | Konishi et al. | 320/120 |
| 7,649,340 B2 * | 1/2010 | Sato et al. | 320/134 |
| RE41,915 E * | 11/2010 | Haraguchi et al. | 320/134 |
| 8,103,401 B2 * | 1/2012 | Kubo et al. | 701/34.1 |
| 8,148,944 B2 * | 4/2012 | Goto | 320/128 |
| 8,154,253 B2 * | 4/2012 | Omagari | 320/134 |
| 8,163,411 B2 * | 4/2012 | Mizoguchi et al. | 429/61 |
| 8,169,190 B2 * | 5/2012 | Miyazaki et al. | 320/118 |
| 8,330,469 B2 * | 12/2012 | Miyamoto | 324/433 |
| 8,471,526 B2 * | 6/2013 | Kanno | 320/116 |
| 8,518,570 B2 * | 8/2013 | Kudo et al. | 429/91 |
| 8,704,491 B2 * | 4/2014 | Sugiura | 320/134 |
| 8,729,850 B2 * | 5/2014 | Utsuno | 320/102 |
| 8,829,717 B2 * | 9/2014 | Kudo et al. | 307/77 |
| 2010/0052619 A1 * | 3/2010 | Bishop et al. | 320/136 |
| 2010/0052650 A1 | 3/2010 | Yoshida et al. | |
| 2010/0253284 A1 * | 10/2010 | Aoki et al. | 320/118 |
| 2011/0169458 A1 * | 7/2011 | Sugiura | 320/134 |
| 2012/0161715 A1 * | 6/2012 | Park | 320/136 |
| 2013/0009466 A1 * | 1/2013 | Kumagai | 307/10.1 |
| 2013/0069597 A1 * | 3/2013 | Sugimura | 320/118 |
| 2013/0175994 A1 * | 7/2013 | Endo et al. | 320/116 |
| 2013/0200847 A1 * | 8/2013 | Kurokawa et al. | 320/112 |
| 2014/0232321 A1 * | 8/2014 | Utsuno | 320/101 |

FOREIGN PATENT DOCUMENTS

| | | |
|---|---|---|
| JP | 2010523966 A | 7/2010 |
| WO | 2008120163 A2 | 10/2008 |

\* cited by examiner

COMPARATOR CIRCUIT, SEMICONDUCTOR DEVICE, BATTERY MONITORING SYSTEM, CHARGING PROHIBITION METHOD, AND COMPUTER-READABLE MEDIUM THAT DETECTS BATTERY VOLTAGES LOWER THAN A LOWEST OPERATIONAL POWER SUPPLY VOLTAGE

CROSS-REFERENCE TO RELATED APPLICATION

This application claims priority under 35 USC 119 from Japanese Patent Application No. 2011-109613 filed on May 16, 2011, the disclosure of which is incorporated by reference herein.

BACKGROUND OF THE INVENTION

1. Field of the Invention

The present invention relates to a comparator circuit, a semiconductor device, a battery monitoring system, a charging prohibition method, and a computer-readable medium in which is stored a charging prohibition program. The present invention particularly relates to a comparator circuit that compares a voltage of a positive electrode and a voltage of a negative electrode of a battery cell, a semiconductor device, a battery monitoring system, a charging prohibition method, and a computer-readable medium in which is stored a charging prohibition program.

2. Description of the Related Art

Generally, batteries (specific examples include lithium ion batteries) that are assembled batteries in which plural batteries (battery cells) that are rechargeable are connected in series are used as large-capacity, high-output batteries used to drive motors in hybrid vehicles and electric vehicles. Battery monitoring systems provided with a protection circuit for protecting the battery are known.

For example, in Japanese Patent Application Laid-Open (JP-A) No. 11-155241, there is described a charging current control circuit and an assembled battery charging method that can, when charging an assembled battery in which plural battery cells that are rechargeable are connected in series, fully charge all battery cells even when using battery cells with different characteristics.

In a battery monitoring system like this, in a case where the voltage of a battery cell is extremely small, there are cases where irreversible deterioration of the battery cell occurs. For example, in a lithium ion battery cell, when the battery voltage becomes equal to or less than 0.6 V, the copper of the copper foil that is the coated base material of the negative electrode ionizes, dissolves into the electrolyte, and precipitates everywhere inside the battery cell. Because of this, the function of the positive electrode deteriorates, the container (iron) dissolves, holes form, and the electrolyte leaks. Moreover, in a case where the electrolyte has leaked, charging current flows through the electrolyte, so sometimes the printed board to which the electrolyte has adhered gives off heat, gives off smoke, and moreover ignites.

In order to respond to the above situation, a charging prohibition voltage is determined, and generally in a case where, even in one of the battery cells included in the assembled battery, the battery voltage thereof has become equal to or less than the charging prohibition voltage, a predetermined processing such as prohibiting charging is performed.

For that reason, the protection circuit of the battery monitoring system is configured to include a voltage detection circuit for detecting whether or not the battery voltage of a battery cell has become equal to or less than the charging prohibition voltage. FIG. 13 shows a specific example of a conventional voltage detection circuit 2000. The voltage detection circuit 2000 is disposed for each battery cell in a plurality of battery cells connected in series (see FIG. 2). As shown in FIG. 13, the conventional voltage detection circuit 2000 is configured by a comparator circuit that compares a voltage obtained by dividing the battery voltage of each battery cell (the difference between the voltage of the high potential side and the voltage of the low potential side) by the resistance with a reference voltage generated by a reference voltage generating circuit and outputs the comparison result.

However, the above technology cannot detect the battery voltage in a case where the battery voltage of the battery cell is low.

The reference voltage generating circuit and the comparator circuit configuring the voltage detection circuit 2000 shown in FIG. 13 are generally configured by CMOS (complementary metal-oxide semiconductor) integrated circuits, so the lowest operational power supply voltage is constrained by the threshold value Vt of the MOS transistors. The power for the reference voltage generating circuit and the comparator circuit is supplied from each battery cell, so when the battery voltage of the battery cell becomes an extremely low voltage, such as equal to or less than 1 V, for example, the power supply voltage of the reference voltage generating circuit and the comparator circuit ends up becoming equal to or less than 1 V.

The aforementioned charging prohibition voltage differs depending on the battery cell, but generally a voltage of about 0.7 V is used. Further, in recent battery cells, there is a desire to make the charging prohibition voltage about 0.1 V to about 0.2 V.

However, in the voltage detection circuit 2000, if the battery voltage of the battery cell is lower than the lowest operational power supply voltage, there are cases where the reference voltage generating circuit and the comparator circuit do not operate. Consequently, the voltage detection circuit 2000 can only, being subject to the constraint of the lowest operational power supply voltage, detect a battery voltage that exceeds the lowest operating power supply voltage. In a case where the battery voltage of the battery cell is an extremely low voltage, such as equal to or less than 1 V, the voltage detection circuit 2000 cannot detect the charging prohibition voltage because it cannot detect the battery voltage.

Particularly in a case where the battery voltage of the battery cell has decreased abruptly, the battery voltage that has become low cannot be detected, so a situation such as described above ends up occurring because charging cannot be prohibited and the battery cell whose battery voltage is equal to or less than the charging prohibition voltage ends up being charged.

SUMMARY OF THE INVENTION

The present invention has been made in view of the above circumstances and provides a comparator circuit, a semiconductor device, a battery monitoring system, a charging prohibition method, and a computer-readable storage medium in which is stored a charging prohibition program.

According to a first aspect of the invention, there is provided a comparator circuit including: a switching element that is disposed between a positive electrode of a battery cell and a fixed potential supply source, that has a control terminal connected to a negative electrode of the battery cell, and that operates in response to a voltage applied from the battery cell to the control terminal; a voltage regulating unit that is disposed between the battery cell and the switching element and that regulates the voltage applied from the battery cell to the switching element; and an output signal line that outputs a potential between the switching element and the fixed potential supply source.

According to a second aspect of the invention, there is provided a semiconductor device including: the comparator circuit according to the first aspect of the invention; and a processing circuit that performs processing that prohibits charging of the battery cell in a case in which the potential outputted from the output signal line of the comparator circuit is the potential of the fixed potential supply source.

According to a third aspect of the invention, there is provided a battery monitoring system including: a plurality of battery cells connected in series; a semiconductor device including the comparator circuit according to the first aspect of the invention, the comparator circuit comparing a voltage of a high potential side and a voltage of a low potential side of the battery cells; and a charging circuit that charges the plurality of battery cells.

According to a fourth aspect of the invention, there is provided a charging prohibition method including: acquiring a potential that is outputted from an output signal line of a comparator circuit, the comparator circuit including: a switching element that is disposed between a positive electrode of a battery cell and a fixed potential supply source, that has a control terminal connected to a negative electrode of the battery cell, and that operates in response to a voltage applied from the battery cell to the control terminal; a voltage regulating unit that is disposed between the battery cell and the switching element and that regulates the voltage applied from the battery cell to the switching element; and the output signal line, which outputs the potential between the switching element and the fixed potential supply source; judging whether or not the acquired potential is the potential of the fixed potential supply source; and determining that the voltage of the battery cell is equal to or less than a charging prohibition voltage in a case in which it is judged that the acquired potential is the potential of the fixed potential supply source.

According to a fifth aspect of the invention, there is provided a charging prohibition method including: performing, with respect to each battery cell in a plurality of battery cells, processing that acquires a potential that is outputted from an output signal line of a comparator circuit, the comparator circuit including: a switching element that is disposed between a positive electrode of a battery cell and a fixed potential supply source, that has a control terminal connected to a negative electrode of the battery cell, and that operates in response to a voltage applied from the battery cell to the control terminal; a voltage regulating unit that is disposed between the battery cell and the switching element and that regulates the voltage applied from the battery cell to the switching element; and the output signal line, which outputs the potential between the switching element and the fixed potential supply source; and acquiring a number of outputs in which the acquired potential is the potential of the fixed potential supply source; and determining, in accordance with a set value predetermined in accordance with a charging prohibition voltage and the acquired number of outputs in which the acquired potential is the potential of the fixed potential supply source, that the voltage of the battery cell is equal to or less than the charging prohibition voltage.

According to a sixth aspect of the invention, there is provided a computer-readable medium in which is stored a program for causing a computer to execute charging prohibition processing, the charging prohibition processing including: acquiring a potential that is outputted from an output signal line of a comparator circuit, the comparator circuit including: a switching element that is disposed between a positive electrode of a battery cell and a fixed potential supply source, that has a control terminal connected to a negative electrode of the battery cell, and that operates in response to a voltage applied from the battery cell to the control terminal; a voltage regulating unit that is disposed between the battery cell and the switching element and that regulates the voltage applied from the battery cell to the switching element; and the output signal line, which outputs the potential between the switching element and the fixed potential supply source; judging whether or not the acquired potential is the potential of the fixed potential supply source; and determining that the voltage of the battery cell is equal to or less than a charging prohibition voltage in a case in which it is judged that the acquired potential is the potential of the fixed potential supply source.

According to a seventh aspect of the invention, there is provided a computer-readable medium in which is stored a program for causing a computer to execute charging prohibition processing, the charging prohibition processing including: performing, with respect to each battery cell in a plurality of battery cells, processing that acquires a potential outputted from an output signal line of a comparator circuit, the comparator circuit including: a switching element that is disposed between a positive electrode of a battery cell and a fixed potential supply source, that has a control terminal connected to a negative electrode of the battery cell, and that operates in response to a voltage applied from the battery cell to the control terminal; a voltage regulating unit that is disposed between the battery cell and the switching element and that regulates the voltage applied from the battery cell to the switching element; and the output signal line, which outputs the potential between the switching element and the fixed potential supply source; acquiring a number of outputs in which the acquired potential is the potential of the fixed potential supply source; and determining, in accordance with a set value predetermined in accordance with a charging prohibition voltage and the acquired number of outputs in which the acquired potential is the potential of the fixed potential supply source, that the voltage of the battery cell is equal to or less than the charging prohibition voltage.

According to the present invention, even in a case where the battery voltage of a battery cell is low, the battery voltage of the battery cell may be detected.

BRIEF DESCRIPTION OF THE DRAWINGS

Preferred embodiments of the present invention will be described in detail based on the following figures, wherein.

DETAILED DESCRIPTION OF THE INVENTION

First Embodiment

First, a comparator circuit of a first embodiment and a battery monitoring system including a semiconductor device provided with the comparator circuit will be described in detail below with reference to the drawings.

Figure 1:
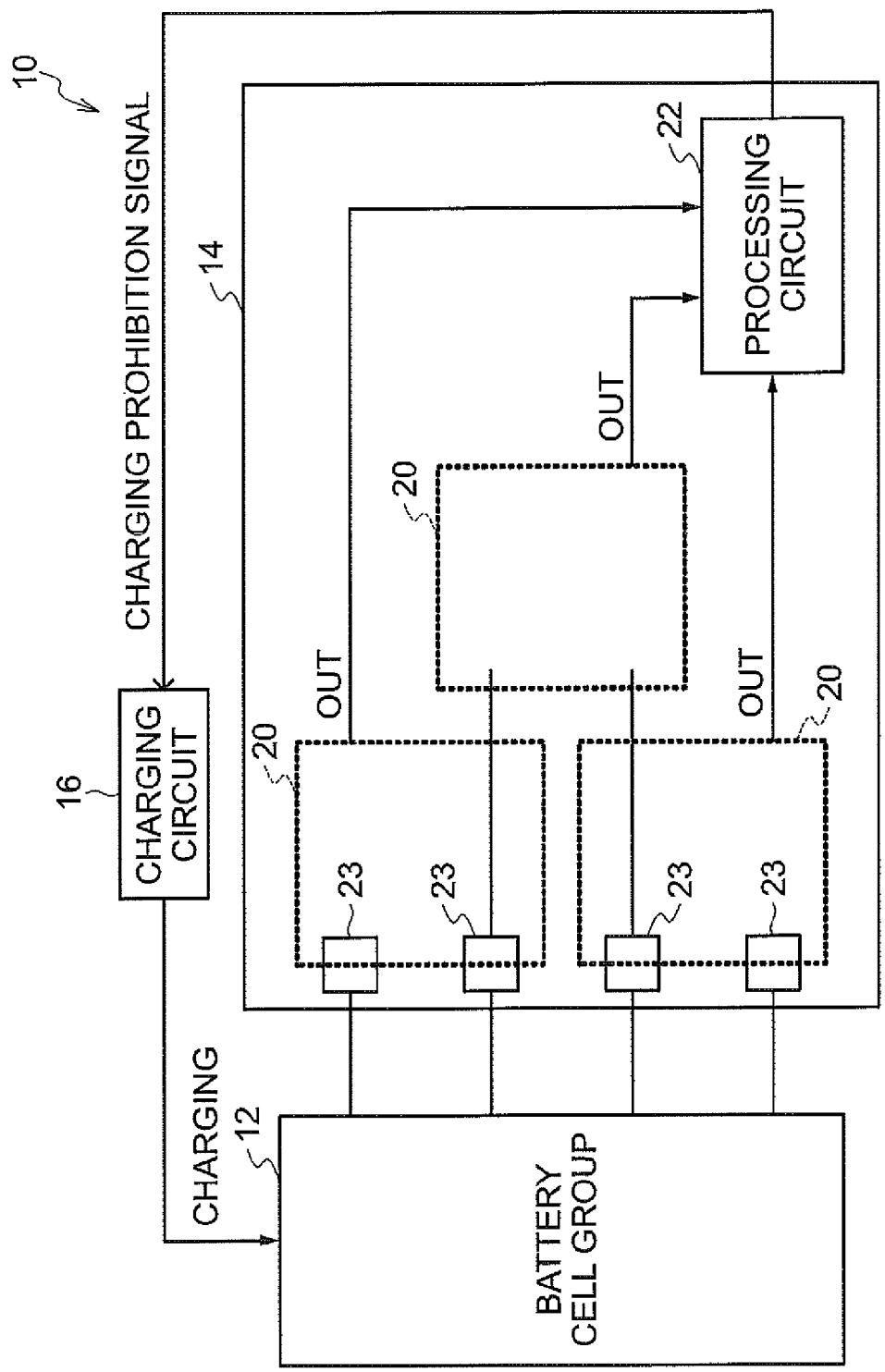
FIG. 1 is a circuit diagram showing an example of the schematic configuration of a battery monitoring system pertaining to a first embodiment.

First, the configuration of a battery monitoring system 10 of the present embodiment will be described. FIG. 1 shows an example of the schematic configuration of the battery monitoring system 10 of the present embodiment. The battery monitoring system 10 of the present embodiment shown in FIG. 1 is configured to include a battery cell group 12 including a plurality of battery cells (FIG. 1 shows a battery cell group 12 including three battery cells as a specific example), a semiconductor circuit 14 including voltage detection circuits 20 that detect the battery voltage of each battery cell in the battery cell group 12, and a charging circuit 16 for charging the battery cell group 12.

The charging circuit 16 has the function of charging the battery cell group 12. For example, the charging circuit 16 has the function of performing charging by applying a predetermined voltage to the positive electrode (high potential) side of the battery cell that is uppermost (on the highest voltage side) and the negative electrode (low potential) side of the battery cell that is lowermost (on the lowest potential side).

The semiconductor circuit 14 is configured to include the voltage detection circuits 20 and a processing circuit 22. The high voltage side and the low voltage side of each battery cell in the battery cell group 12 are connected via terminals (pads) 23 to the semiconductor circuit 14 (see FIG. 2).

Figure 2:
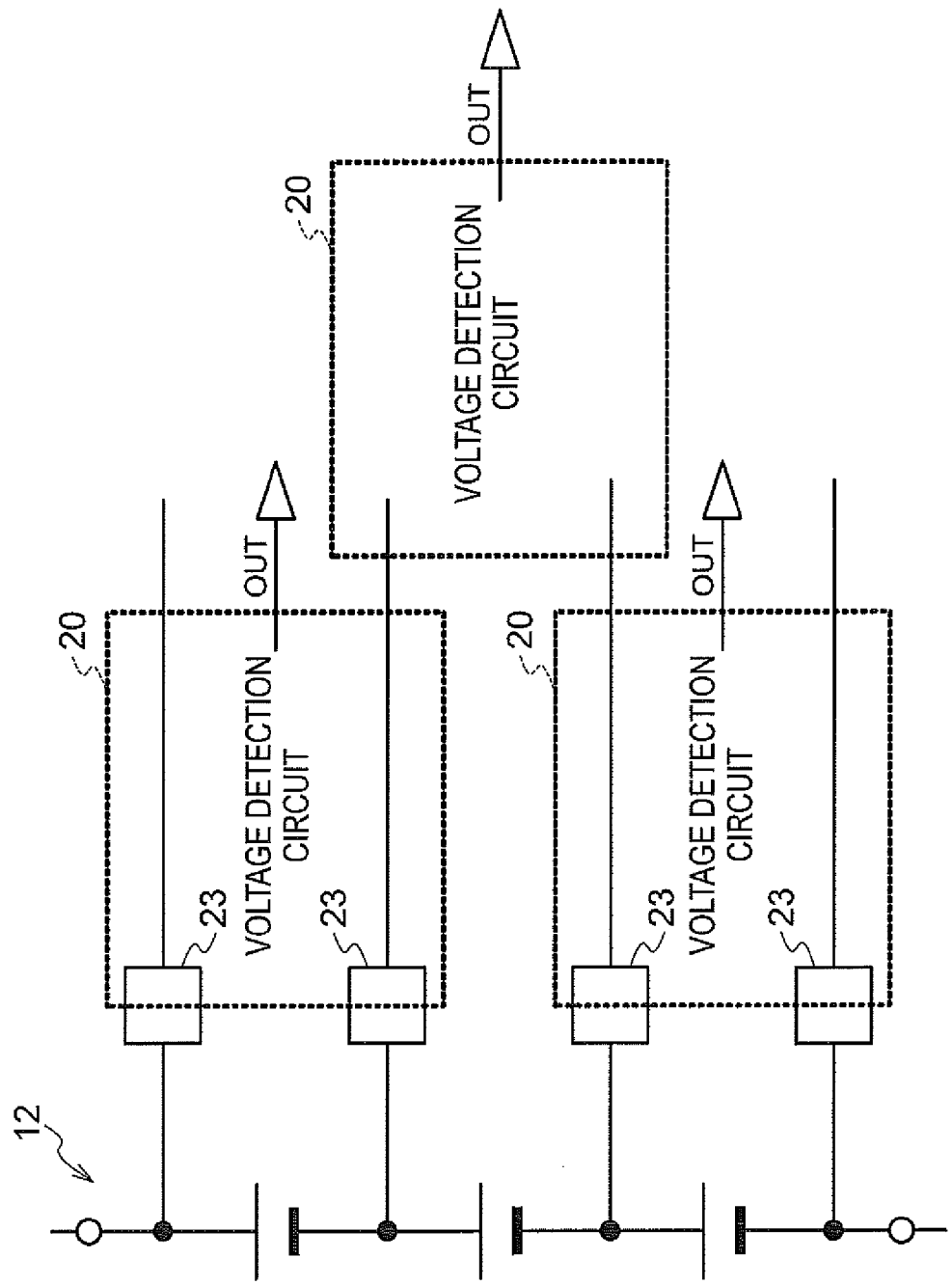
FIG. 2 is a schematic configuration diagram showing an example of the relationship between voltage detection circuits and a battery cell group pertaining to the first embodiment.

In the present embodiment, the voltage detection circuits 20 are disposed for each battery cell. That is, the voltage detection circuits 20 are disposed in a number equal to the number of the battery cells in the battery cell group 12. FIG. 2 shows the relationship between the voltage detection circuits 20 and the battery cell group 12 in the present embodiment. The voltage detection circuits 20 are comparator circuits that compare the voltage of the positive electrode (high potential) side and the voltage of the negative electrode (low potential) side of the battery cells. Specifically, the voltage detection circuits 20 have the function of outputting a predetermined potential (in the present embodiment, a GND level) as an output signal OUT in a case where the difference (the battery voltage of the battery cell) between the voltage of the positive electrode (high potential) side and the voltage of the negative electrode (low potential) side is equal to or less than a predetermined voltage (a charging prohibition voltage). In the semiconductor circuit 14 of the present embodiment, all of the voltage detection circuits 20 have the same configuration.

The processing circuit 22 is configured by a CPU and memories such as a ROM and a RAM. The processing circuit 22 has the function of performing predetermined processing (e.g., outputting an instruction to the charging circuit 16 to prohibit charging of the battery cell group 12) depending on whether or not the output signals OUT outputted from the voltage detection circuits 20 are a predetermined potential (details described later).

Figure 3:
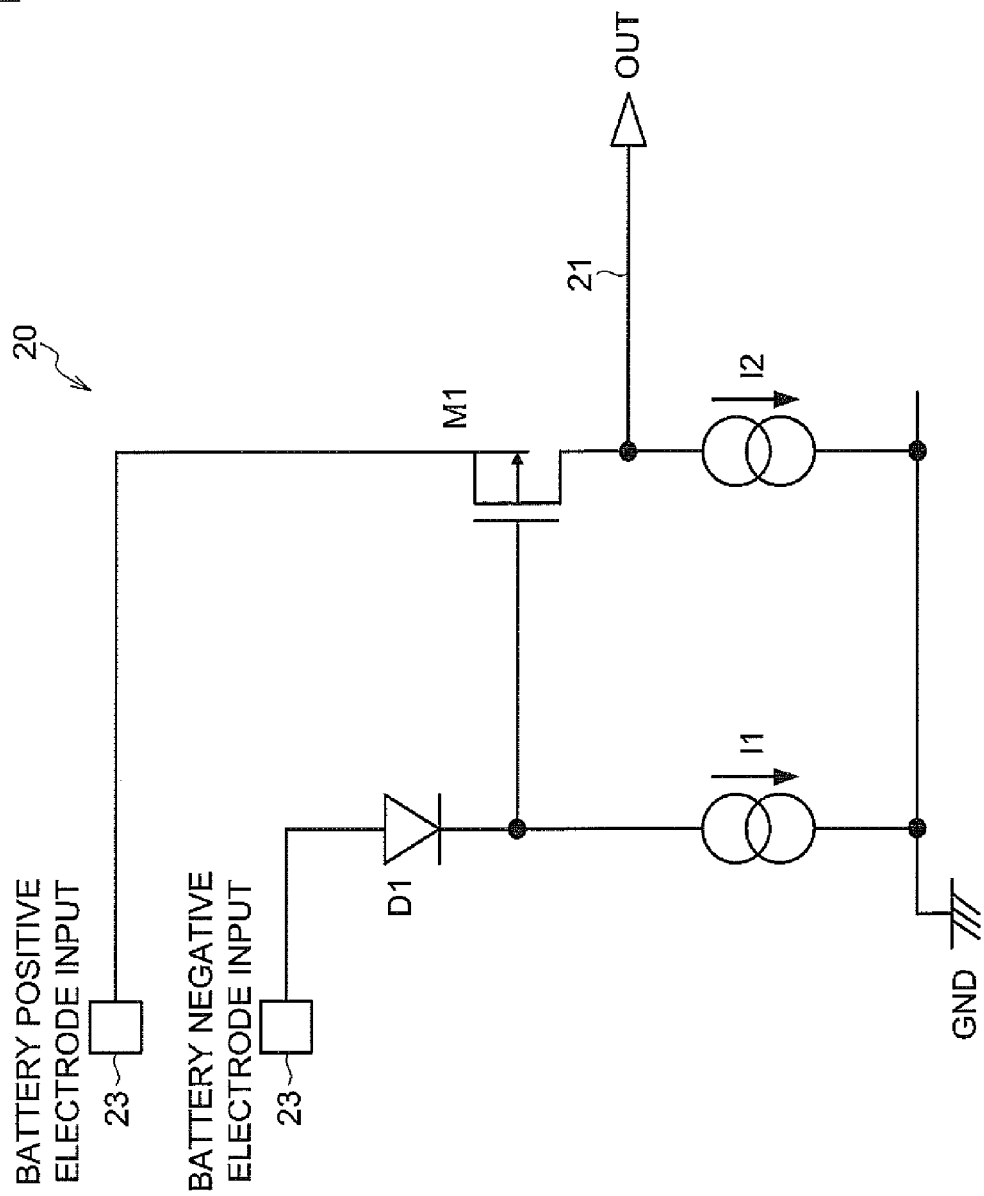
FIG. 3 is a circuit diagram showing an example of the schematic configuration of a voltage detection circuit pertaining to the first embodiment.

Next, the voltage detection circuit 20 of the present embodiment will be described in detail. FIG. 3 is a circuit diagram showing an example of the schematic configuration of the voltage detection circuit 20 of the present embodiment.

The voltage detection circuit 20 of the present embodiment is configured to include a PMOS transistor M1 that functions as a switching element, a diode D1, a constant current source I1, and a constant current source I2. Further, the voltage detection circuit 20 is also provided with an output signal line 21 for outputting, as the output signal OUT, the potential between the PMOS transistor M1 and the constant current source I2.

The anode terminal of the diode D1 is connected to the negative electrode (low potential) side of the battery cell, and the cathode terminal of the diode D1 is connected to the constant current source I1. The diode D1 of the present embodiment has the function of regulating the voltage applied from the negative electrode (low potential) side of the battery cell to the gate terminal of the PMOS transistor M1 (details described later).

The source terminal of the PMOS transistor M1 is connected via the terminal (pad) 23 to the positive electrode side of the battery cell, and the drain terminal of the PMOS transistor M1 is connected to the constant current source I2. Further, the gate terminal of the PMOS transistor M1 is connected between the diode D1 and the constant current source I1.

One end of the constant current source I1 is connected to the diode D1, and the other end of the constant current source I1 is connected to a fixed potential supply source (in the present embodiment. Refer to it as the GND level). Further, one end of the constant current source I2 is connected to the PMOS transistor M1, and the other end of the constant current source I2 is connected to the fixed potential supply source (in the present embodiment, equal to or less than the GND level; called "the GND level").

Further, the output signal line 21 for outputting the output signal OUT is connected between the PMOS transistor M1 and the constant current source I2.

Next, the voltage detection operation of the voltage detection circuit 20 of the present embodiment will be described.

First, a case where the battery voltage of the battery cell is high will be described. In a case where the voltage of the battery cell is high, the difference between the voltage of the positive electrode (high potential) side and the voltage of the negative electrode (low potential) side of the battery cell is large, and the gate-source voltage of the PMOS transistor M1 exceeds a threshold voltage Vt of the PMOS transistor M1, the PMOS transistor M1 switches on and current is supplied to the constant current source I2. Because of this, the output signal OUT outputted via the output signal line 21 becomes the voltage level of the positive electrode (high potential) side of the battery cell.

Next, a case where the battery voltage of the battery cell is low will be described. In a case where the voltage of the battery cell is low, the difference between the voltage of the positive electrode (high potential) side and the voltage of the negative electrode (low potential) side of the battery cell is small, and the gate-source voltage of the PMOS transistor M1 is equal to or less than the threshold voltage Vt of the PMOS transistor M1, the PMOS transistor M1 switches off and current is no longer supplied to the constant current source I2. Because of this, the output signal OUT outputted via the output signal line 21 becomes the GND level.

Here, in the present embodiment, the threshold value at which the output signal OUT changes from the voltage level of the positive electrode (high potential) side of the battery cell to the GND level depending on the difference between the voltage of the positive electrode (high potential) side and the voltage of the negative electrode (low potential) side of the battery cell can be set to a voltage value that is smaller than the threshold voltage Vt of the PMOS transistor M1 as a result of the voltage applied from the negative electrode (low potential) side of the battery cell to the gate terminal of the PMOS transistor M1 being regulated by the diode D1.

A voltage equal to the difference between the voltage applied from the negative electrode (low potential) side of the battery cell and the anode-cathode voltage of the diode D1 is applied to the gate terminal of the PMOS transistor M1. For that reason, the gate-source voltage of the PMOS transistor M1 becomes a voltage value equal to the sum of the difference between the voltage on the positive electrode (high potential) side and the voltage on the negative electrode (low potential) side of the battery cell and the anode-cathode voltage of the diode D1.

That is, in the voltage detection circuit 20 of the present embodiment, the threshold value at which the level of the output signal OUT changes becomes a voltage equal to the difference between the threshold voltage Vt of the PMOS transistor M1 and the anode-cathode voltage of the diode D1. Generally, the threshold voltage Vt of the PMOS transistor M1 is equal to 0.8 V and the forward voltage of the diode D1 is equal to 0.7 V, so the threshold voltage at which the level of the output signal OUT changes becomes equal to the difference between 0.8 V and 0.7 V, which is 0.1 V (0.8 V−0.7 V=0.1 V), and the threshold voltage can be set to a low voltage.

Consequently, in the voltage detection circuit 20 of the present embodiment, the voltage of the battery cell can be detected to 0.1 V.

Figure 4:
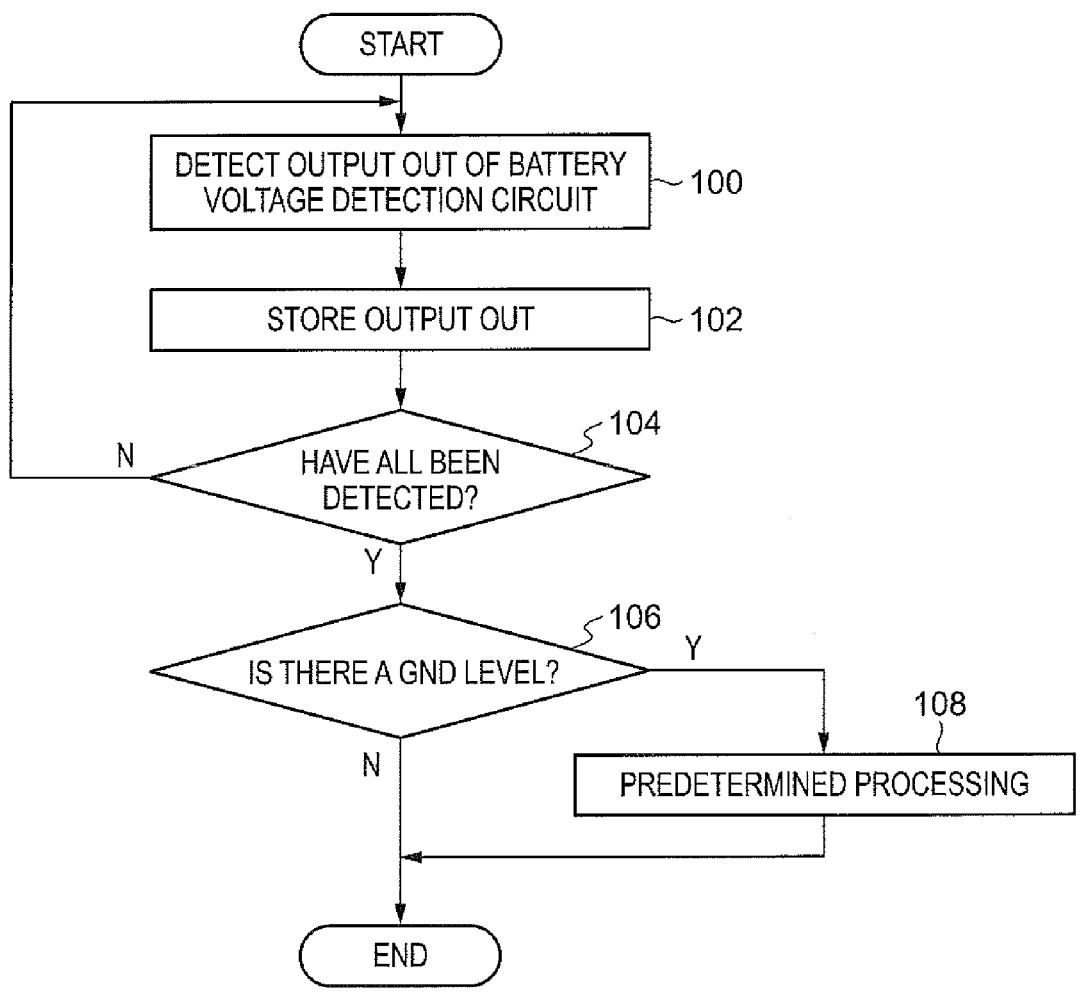
FIG. 4 is a flowchart showing an example of a flow of a charging prohibition determination operation pertaining to the first embodiment.

Next, a battery cell charging prohibition determination operation in the semiconductor circuit 14 of the present embodiment will be described. In the semiconductor circuit 14 of the present embodiment, the charging prohibition determination operation is performed as a result of a program stored in the memory being executed by the CPU of the processing circuit 22. FIG. 4 is a flowchart showing an example of a flow of the charging prohibition determination operation of the present embodiment.

In step 100, the output signals OUT of the voltage detection circuits 20 is detected. Here, the output signal OUT of any one of the voltage detection circuits 20 is detected. In the next step 102, the detected output signal OUT is stored in a memory or the like.

In the next step 104, it is judged whether or not the output signals OUT of all of the voltage detection circuits 20 has been detected. In a case where there is a voltage detection circuit 20 whose output signal OUT has not yet been detected (e.g., in the semiconductor circuit 14 shown in FIG. 1 and FIG. 2, a case where the output signals OUT of the three voltage detection circuits 20 has not been detected), the answer is NO and the processing returns to step S100 and the processing of detecting and storing the output signals OUT is repeated. On the other hand, in a case where it has been detected the output signals OUT of all of the voltage detection circuits 20, the answer is YES and the processing advances to step 106.

In step 106, it is determined whether or not there is an output signal OUT indicating the GND level in the stored output signals OUT. In a case where there is no output signal OUT indicating the GND level, the voltages of all of the battery cells are equal to or greater than the charging prohibition voltage, so the processing ends. On the other hand, in a case where there is even one output signal OUT indicating the GND level, the processing advances to step 108, a predetermined processing is performed, and thereafter the processing ends. The predetermined processing is a processing such as outputting to the charging circuit 16 a prohibition signal for prohibiting the charging circuit 16 from charging and/or giving notification to the outside of the battery monitoring system 10 that the voltage of a battery cell has become equal to or less than the charging prohibition voltage. The predetermined processing is a processing for preventing a battery cell whose battery voltage has become equal to or less than the charging prohibition voltage from ending up being charged, so that a situation such as the copper ion precipitation or electrolyte leakage described above does not occur.

As described above, the voltage detection circuit 20 in the semiconductor circuit 14 of the battery monitoring system 10 of the present embodiment is configured to include the PMOS transistor M1 that functions as a switching element, the diode D1, the constant current source I1, and the constant current source I2. Further, the voltage detection circuit 20 is also provided with the output signal line 21 for outputting, as the output signal OUT, the potential between the PMOS transistor M1 and the constant current source I2. The anode terminal of the diode D1 is connected to the negative electrode (low potential) side of the battery cell, and the cathode terminal of the diode D1 is connected to the constant current source I1. The source terminal of the PMOS transistor M1 is connected via the terminal (pad) 23 to the positive electrode side of the battery cell, the drain terminal of the PMOS transistor M1 is connected to the constant current source I2, and the gate terminal of the PMOS transistor M1 is connected between the diode D1 and the constant current source I1.

In a case where the voltage of the battery cell is high and the gate-source voltage of the PMOS transistor M1 exceeds the threshold voltage Vt of the PMOS transistor M1, the PMOS transistor M1 switches on and the output signal OUT becomes the voltage level of the positive electrode (high potential) side of the battery cell. On the other hand, in a case where the battery voltage of the battery cell is low and the gate-source voltage of the PMOS transistor M1 is equal to or less than the threshold voltage Vt of the PMOS transistor M1, the PMOS transistor M1 switches off and the output signal OUT becomes the GND level.

At this time, in the present embodiment, the voltage applied from the negative electrode (low potential) side of the battery cell to the gate terminal of the PMOS transistor M1 can be lowered by the anode-cathode (forward) voltage of the diode D1, so the threshold value at which the level of the output signal OUT changes can be made equal to the difference between the threshold voltage Vt of the PMOS transistor M1 and the anode-cathode (forward) voltage of the diode D1.

Figure 13:
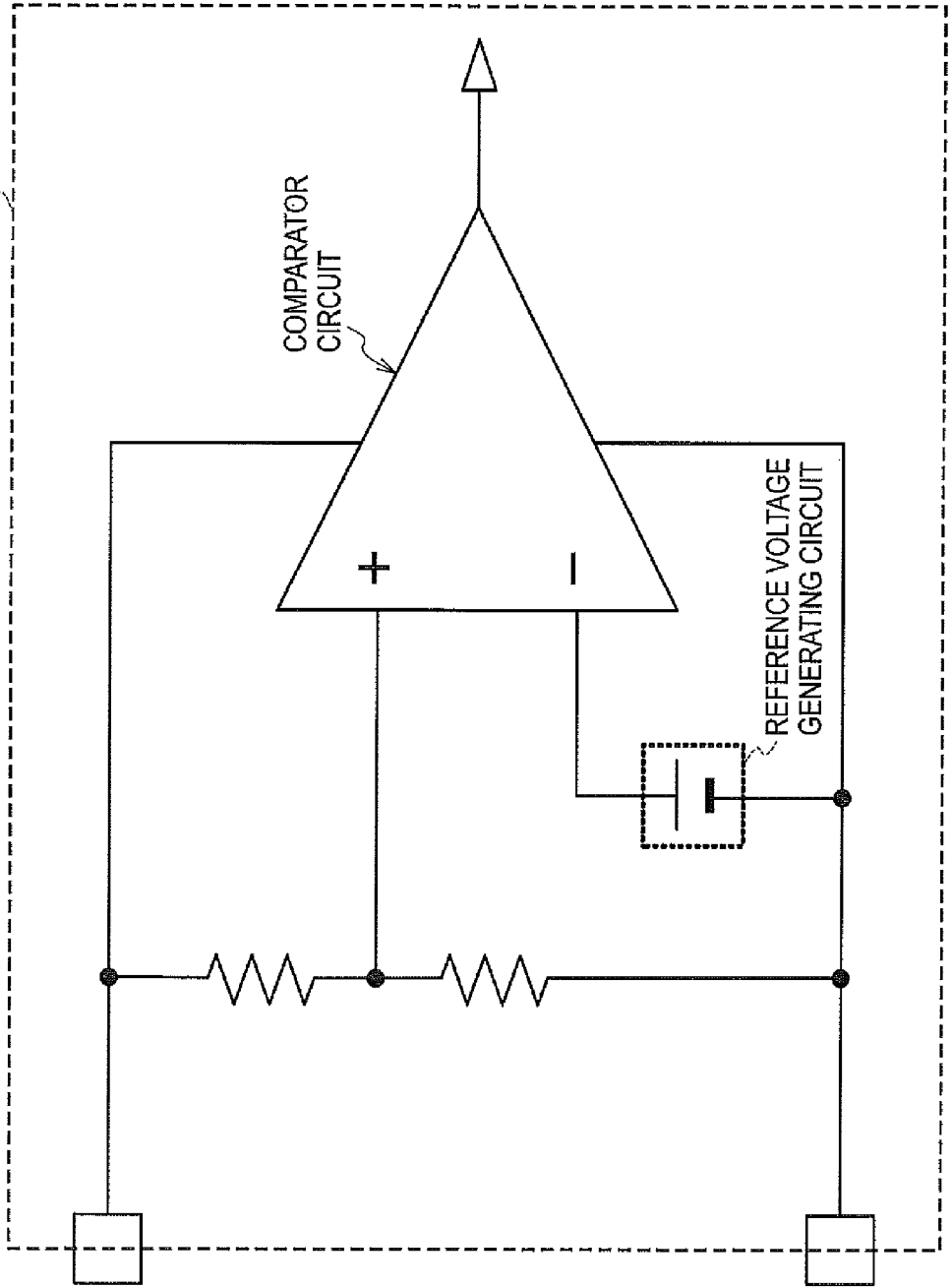
FIG. 13 is a circuit diagram showing an example of the schematic configuration of a conventional voltage detection circuit.

Consequently, even in a case where the battery voltage of the battery cell is low, the battery voltage of the battery cell can be detected. Particularly in the conventional voltage detection circuit 2000 (see FIG. 13), as described above, the lowest voltage that can be detected is restricted dependent on the threshold value Vt of the MOS transistor configuring the voltage detection circuit 2000, but in the voltage detection circuit 20 of the present embodiment, the threshold value at which the level of the output signal OUT changes can be set to a value that is smaller than the threshold voltage Vt of the PMOS transistor M1, so a lower battery voltage of the battery cell can be detected.

Further, in the present embodiment, the processing circuit 22 of the semiconductor circuit 14 detects the levels of the output signals OUT of the voltage detection circuits 20 and determines whether or not there is a GND level output signal OUT. In a case where there is a GND level output signal OUT, the processing circuit 22 determines that the battery voltage of the battery cell detected by the voltage detection circuit 20 whose GND level output signal OUT the processing circuit 22 has detected is equal to or less than the charging prohibition voltage and performs the predetermined processing for prohibiting charging.

Consequently, copper ion precipitation and electrolyte leakage that occur as a result of ending up charging a battery cell whose battery voltage is equal to or less than the charging prohibition voltage can be prevented.

Regarding the voltage detection circuit 20 on the lowest (low potential) side of the battery cell group 12, there are cases where the effect of voltage regulation by the forward voltage of the diode D1 is not obtained and the on/off switching of the PMOS transistor M1 is controlled in accordance with the threshold voltage Vt of the PMOS transistor M1, such as, for example, a case where the potential level of the negative electrode (low potential) side is 0 V, but a voltage lower than in the conventional voltage detection circuit 2000 described above can be detected.

Second Embodiment

A voltage detection circuit 30 of a second embodiment of the present invention will be described below with reference to the drawings. The present embodiment has substantially the same configurations and operations as those of the first embodiment except that the configuration and operation of the voltage detection circuit 30 differ from those of the voltage detection circuit 20 of the first embodiment, so portions that are substantially the same will be indicated as such and detailed description thereof will be omitted.

The battery monitoring system 10 and the semiconductor circuit 14 are substantially the same as those of the first embodiment except that the voltage detection circuit 20 is replaced with the voltage detection circuit 30 of the present embodiment, so detailed description will be omitted here.

Figure 5:
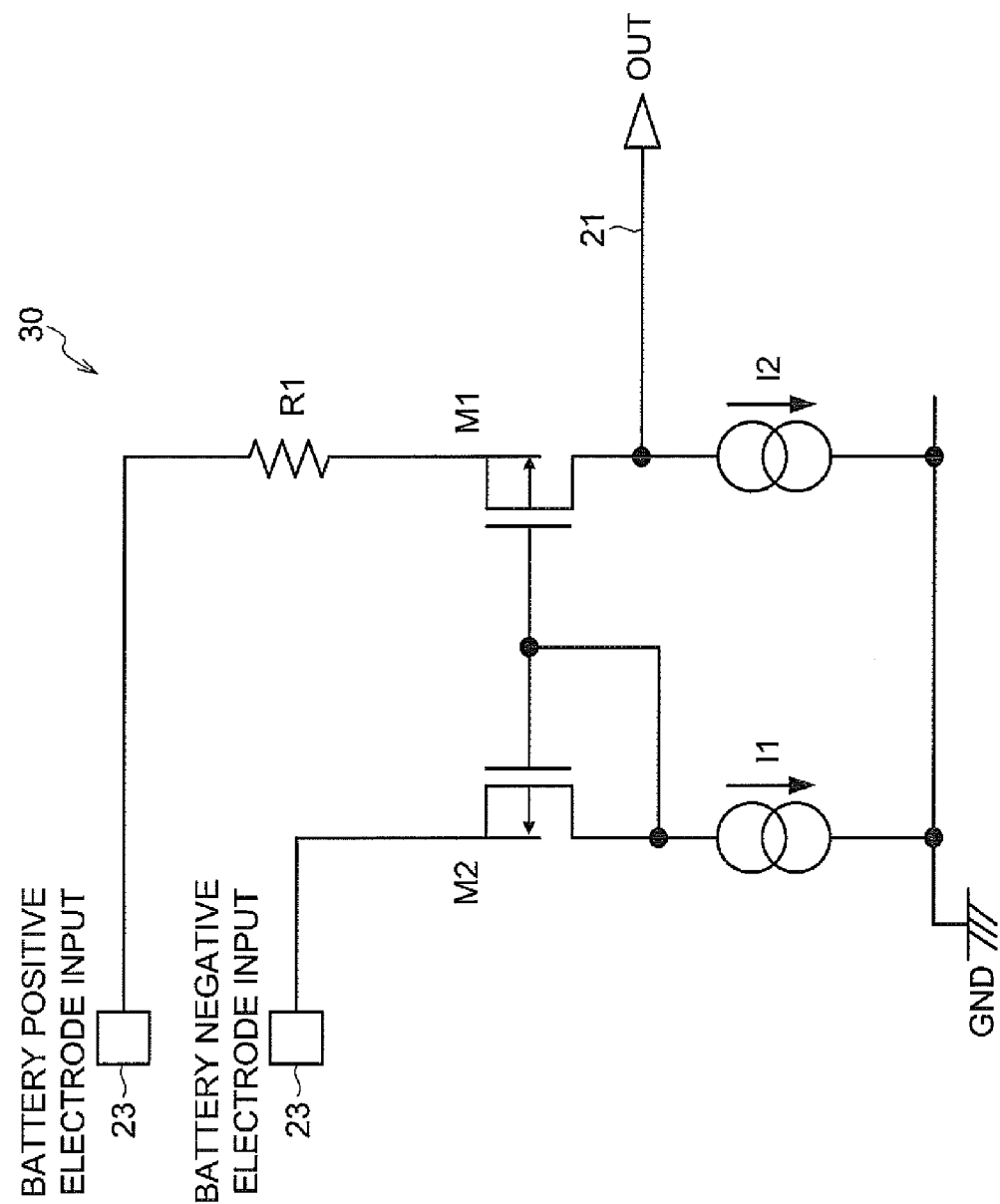
FIG. 5 is a circuit diagram showing an example of the schematic configuration of a voltage detection circuit pertaining to a second embodiment.
Figure 6:
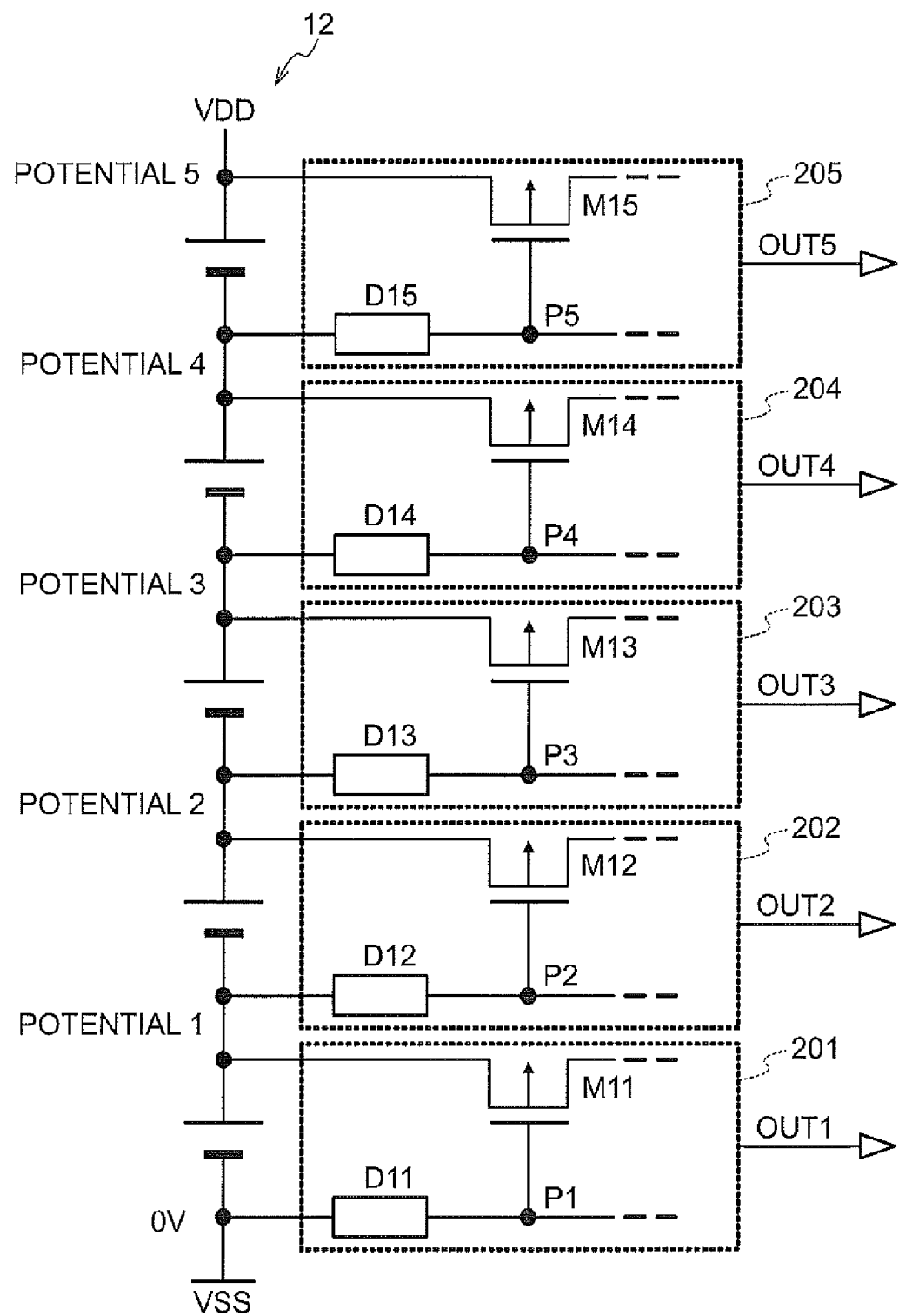
FIG. 6 is a schematic diagram of voltage detection circuits in a semiconductor circuit of a battery monitoring system for describing a charging prohibition determination operation pertaining to a third embodiment.

FIG. 5 is a circuit diagram showing an example of the schematic configuration of the voltage detection circuit 30 of the present embodiment.

The voltage detection circuit 30 of the present embodiment is configured to include a PMOS transistor M1 that functions as a switching element, a PMOS transistor M2, a resistive element R1, a constant current source I1, and a constant current source I2. Further, the voltage detection circuit 30 is also provided with an output signal line 21 for outputting, as an output signal OUT, the potential between the PMOS transistor M1 and the constant current source I2.

The resistive element R1 is disposed between the positive electrode (high potential) side of the battery cell and the source terminal of the PMOS transistor M1. The resistive element R1 of the present embodiment has the function of regulating the voltage applied from the positive electrode (high potential) side of the battery cell to the source terminal of the PMOS transistor M1 (details described later).

The source terminal of the PMOS transistor M1 is connected to the positive electrode (high potential) side of the battery cell via the resistive element R1, and the drain terminal of the PMOS transistor M1 is connected to the constant current source I2. Further, the source terminal of the PMOS transistor M2 is connected to the negative electrode (low potential) side of the battery cell, and the drain terminal of the PMOS transistor M2 is connected to the constant current source I1. Moreover, the gate terminal of the PMOS transistor M1 and the gate terminal of the PMOS transistor M2 are both connected to the drain terminal of the PMOS transistor M2 to configure a current mirror circuit. In the present embodiment, the PMOS transistor M1 and the PMOS transistor M2 are PMOS transistors with the same configuration.

Further, the output signal line 21 for outputting the output signal OUT is connected between the PMOS transistor M1 and the constant current source I2.

Next, the voltage detection operation of the voltage detection circuit 30 of the present embodiment will be described.

First, a case where the battery voltage of the battery cell is high will be described. In a case where the voltage of the battery cell is high, the difference between the voltage of the positive electrode (high potential) side and the voltage of the negative electrode (low potential) side of the battery cell is large, and the gate-source voltage of the PMOS transistor M1 exceeds the threshold voltage Vt of the PMOS transistor M1, the PMOS transistor M1 switches on and current is supplied to the constant current source I2. Because of this, the output signal OUT outputted via the output signal line 21 becomes the voltage level of the positive electrode (high potential) side of the battery cell.

Next, a case where the battery voltage of the battery cell is low will be described. In a case where the voltage of the battery cell is low, the difference between the voltage of the positive electrode (high potential) side and the voltage of the negative electrode (low potential) side of the battery cell is small, and the gate-source voltage of the PMOS transistor M1 is equal to or less than the threshold voltage Vt of the PMOS transistor M1, the PMOS transistor M1 switches off and current is no longer supplied to the constant current source I2. Because of this, the output signal OUT outputted via the output signal line 21 becomes the GND level.

Here, in the present embodiment, the threshold value at which the output signal OUT changes from the voltage level of the positive electrode (high potential) side of the battery cell to the GND level depending on the difference between the voltage of the positive electrode (high potential) side and the voltage of the negative electrode (low potential) side of the battery cell can be set to a voltage value that is smaller than the threshold voltage Vt of the PMOS transistor M1 as a result of the voltage applied from the positive electrode (high potential) side of the battery cell to the source terminal of the PMOS transistor M1 being regulated by the voltage drop of the resistive element R1.

The PMOS transistor M1 and the PMOS transistor M2 configure a current mirror circuit. Further, the voltages applied to the gate terminals of the PMOS transistor M1 and the PMOS transistor M2 become the same. Further, a voltage equal to the difference between the voltage applied from the positive electrode (high potential) side of the battery cell and the voltage drop of the resistive element R1 is applied to the source terminal of the PMOS transistor M1.

Consequently, in the voltage detection circuit 30 of the present embodiment, the threshold value at which the level of the output signal OUT changes becomes a voltage equal to the voltage drop of the resistive element R1 regardless of the threshold voltage Vt of the PMOS transistor M1. Specifically, the voltage drop is determined by the resistance value of the resistive element R1 and the current value of the constant current source I2.

For that reason, in the voltage detection circuit 30 of the present embodiment, by regulating the resistance value of the resistive element R1 and the current value of the constant current source I2, the threshold value at which the level of the output signal OUT changes can be set to an arbitrary value and can be set to a low value.

Consequently, in the voltage detection circuit 30 of the present embodiment, the voltage of the battery cell can be detected to a low voltage (e.g., 0.1 V) regardless of the threshold voltage Vt of the PMOS transistor M1.

The battery cell charging prohibition determination operation in the semiconductor circuit 14 of the present embodiment is substantially the same as that of the first embodiment. That is, the processing circuit 22 of the semiconductor circuit 14 detects the levels of the output signals OUT of the voltage detection circuits 30 and determines whether or not there is a GND level output signal OUT. In a case where there is a GND level output signal OUT, the processing circuit 22 determines that the battery voltage of the battery cell detected by the voltage detection circuit 30 whose GND level output signal OUT the processing circuit 22 has detected is equal to or less than the charging prohibition voltage and performs the predetermined processing for prohibiting charging. Therefore, description of the battery cell charging prohibition determination operation in the semiconductor circuit 14 of the present embodiment will be omitted here.

As described above, the voltage detection circuit 30 in the semiconductor circuit 14 of the battery monitoring system 10 of the present embodiment is configured to include the PMOS transistor M1 that functions as a switching element, the PMOS transistor M2, the resistive element R1, the constant current source I1, and the constant current source I2. Further, the voltage detection circuit 30 is also provided with the output signal line 21 for outputting, as the output signal OUT, the potential between the PMOS transistor M1 and the constant current source I2.

The resistive element R1 is disposed between the positive electrode (high potential) side of the battery cell and the source terminal of the PMOS transistor M1. The source terminal of the PMOS transistor M1 is connected to the positive electrode (high potential) side of the battery cell via the resistive element R1, and the drain terminal of the PMOS transistor M1 is connected to the constant current source I2. The source terminal of the PMOS transistor M2 is connected to the negative electrode (low potential) side of the battery cell, and the drain terminal of the PMOS transistor M2 is connected to the constant current source I1. The gate terminals of the PMOS transistor M1 and the PMOS transistor M2 are both connected to the drain terminal of the PMOS transistor M2 to configure a current mirror circuit.

In a case where the voltage of the battery cell is high and the gate-source voltage of the PMOS transistor M1 exceeds the threshold voltage Vt of the PMOS transistor M1, the PMOS transistor M1 switches on and the output signal OUT becomes the voltage level of the positive electrode (high potential) side of the battery cell. On the other hand, in a case where the battery voltage of the battery cell is low and the gate-source voltage of the PMOS transistor M1 is equal to or less than the threshold voltage Vt of the PMOS transistor M1, the PMOS transistor M4 switches off and the output signal OUT becomes the GND level.

At this time, in the present embodiment, a current mirror circuit is configured. Further, a voltage equal to the difference between the voltage applied from the positive electrode (high potential) side of the battery cell and the voltage drop of the resistive element R1 is applied to the source terminal of the PMOS transistor M1. For this reason, the threshold value at which the level of the output signal OUT changes can be made equal to a voltage value equal to the voltage drop of the resistive element R1 according to the current value of the constant current source I2.

Consequently, by regulating the resistance value of the resistive element R1 and the current value of the constant current source I2, the threshold value at which the level of the output signal OUT changes can be set to an arbitrary value, so even in a case where the battery voltage of the battery cell is low, the battery voltage of the battery cell can be detected.

That is, like in the first embodiment, the threshold value at which the level of the output signal OUT changes can be set to a value that is smaller than the threshold voltage Vt of the PMOS transistor M1, so even a lower battery voltage of the battery cell can be detected.

Further, like in the first embodiment, the processing circuit 22 of the semiconductor circuit 14 performs the predetermined processing for prohibiting charging in a case where the battery voltage of a battery cell is equal to or less than the charging prohibition voltage, so copper ion precipitation and electrolyte leakage that occur as a result of ending up charging a battery cell whose battery voltage is equal to or less than the charging prohibition voltage can be prevented.

Third Embodiment

A third embodiment of the present invention will be described below with reference to the drawings. In the present embodiment, another example of the battery cell charging prohibition determination operation will be described. In the present embodiment, a specific example of a charging prohibition determination operation that determines whether or not the battery voltages of the battery cells in the battery cell group 12 have become equal to or less than the charging prohibition voltage in a case where a system (e.g., a system installed in a car or electric vehicle) provided with the battery cell group 12 is not used for a long period of time and the voltages of the battery cells in the battery cell group 12 have dropped equally (by the same voltage) as a result of each battery cell in the battery cell group 12 having a natural discharge will be described.

FIG. 6 to FIG. 10 are schematic diagrams showing the voltage detection circuits 20 (201 to 205) in the semiconductor circuit 14 of the battery monitoring system 10 for describing the charging prohibition determination operation of the present embodiment. Here, the voltage detection circuits 20 of the first embodiment are used as the voltage detection circuits, but it goes without saying that the voltage detection circuits 30 of the second embodiment may also be used. Further, here, a case where the battery cell group 12 is provided with five battery cells will be described.

In the present embodiment, as a specific example, it will be assumed that the voltage value of the battery cells (a voltage value in a state where charging is complete) is equal to 3.6 V, the threshold voltage Vt of the PMOS transistors M1 (M11 to M15) of the voltage detection circuits 20 (201 to 205) is equal to 0.8 V, and the forward voltage of the diodes D1 (D11 to D15) is equal to 0.7 V.

Figure 7:
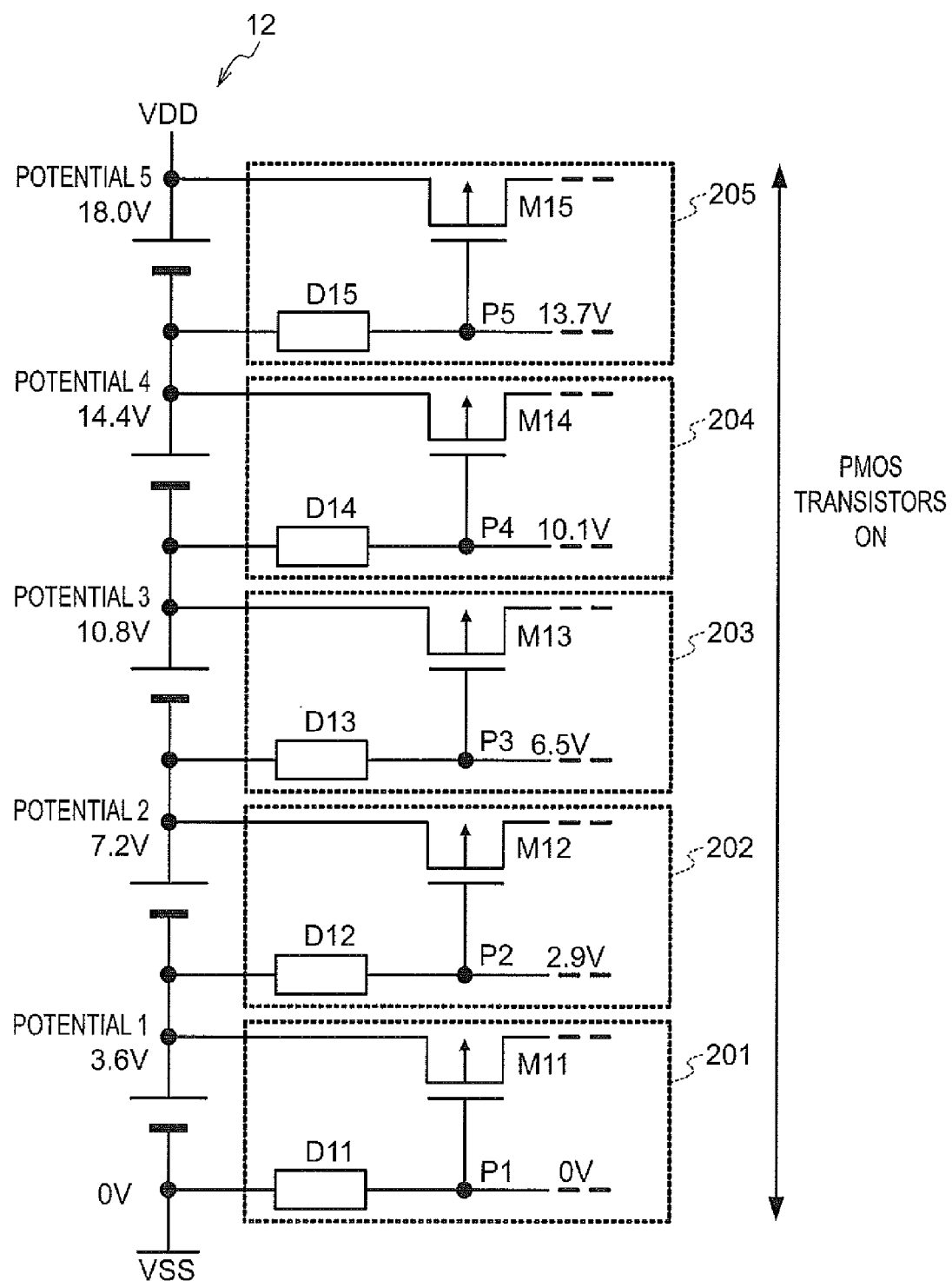
FIG. 7 is a schematic diagram for describing a case where, in the voltage detection circuits shown in FIG. 6, the voltage of each battery cell in the battery cell group is an ideal value (a voltage value when charging is complete: 3.6 Vj.
Figure 8:
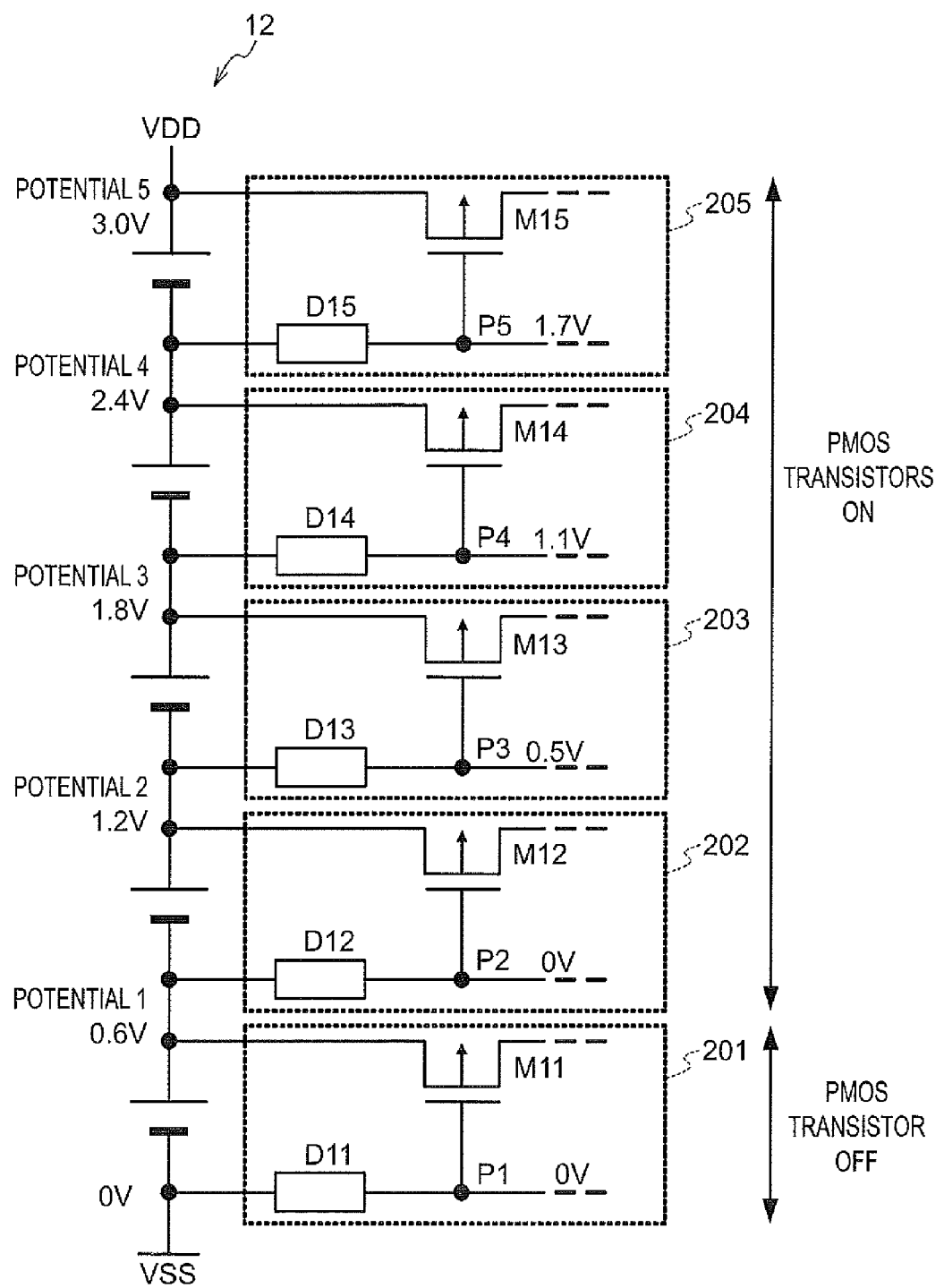
FIG. 8 is a schematic diagram for describing a case where, in the voltage detection circuits shown in FIG. 6, the voltage of each battery cell in the battery cell group has dropped significantly (0.6 V)
Figure 9:
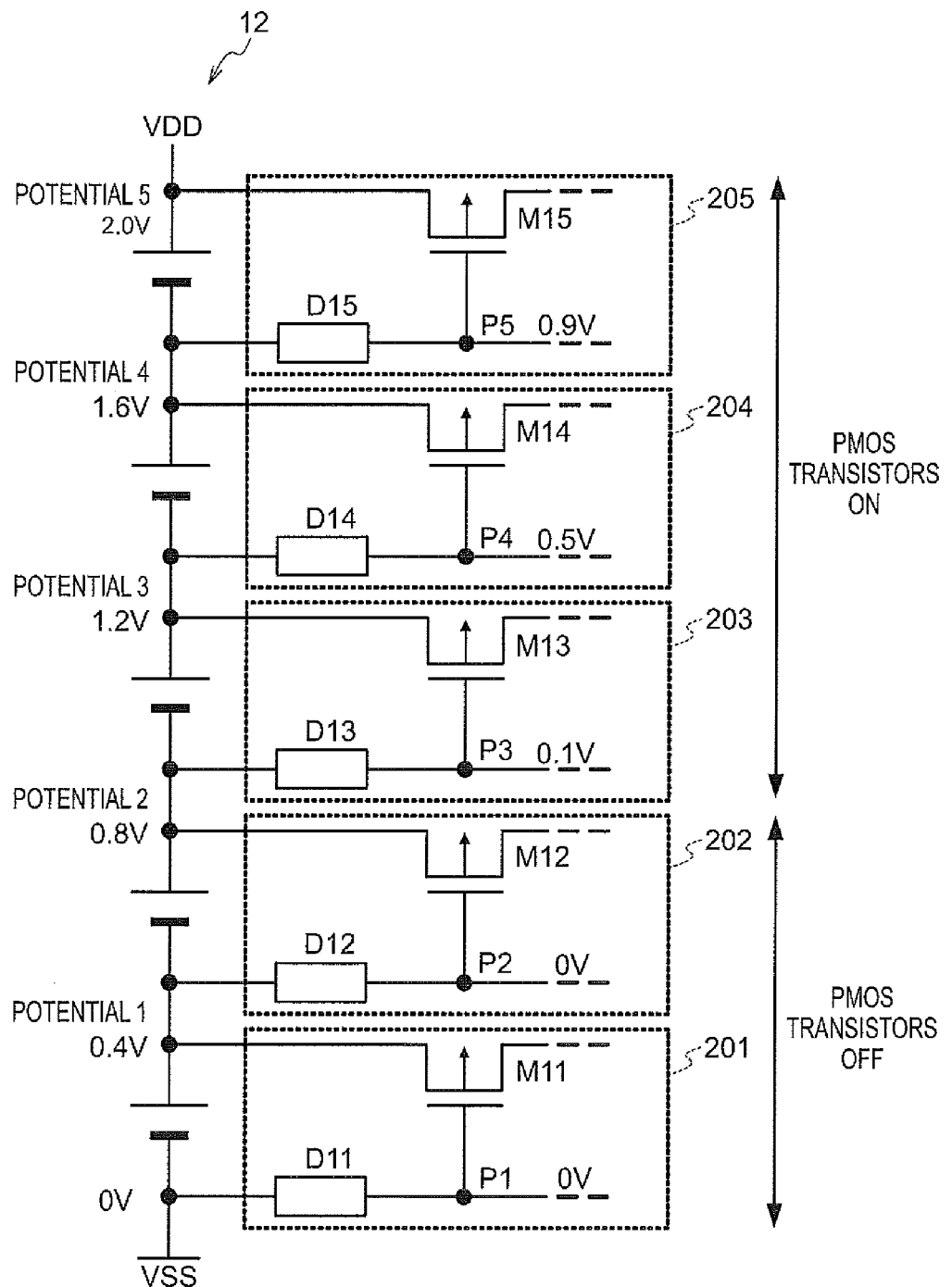
FIG. 9 is a schematic diagram for describing a case where, in the voltage detection circuits shown in FIG. 6, the voltage of each battery cell in the battery cell group has dropped more than in the case shown in FIG. 8 (0.4 V)
Figure 10:
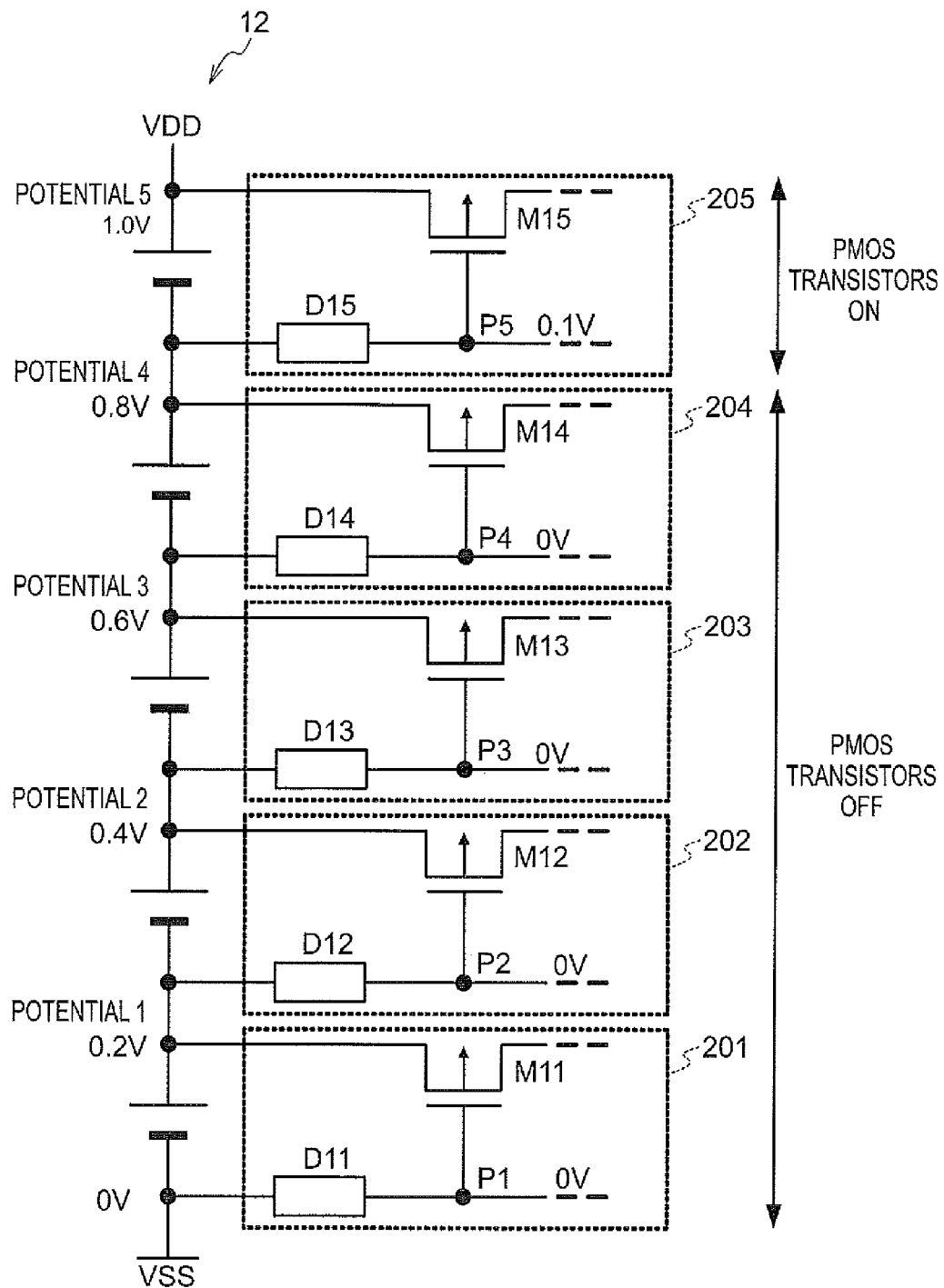
FIG. 10 is a schematic diagram for describing a case where, in the voltage detection circuits shown in FIG. 6, the voltage of each battery cell in the battery cell group has dropped more than in the case shown in FIG. 9 (0.2 V)

First, the operation of the voltage detection circuits 20 (201 to 205) in a case where the voltage value of each battery cell in the battery cell group 12 is an ideal value (a voltage value in a state where charging is complete) will be described with reference to the schematic diagram of FIG. 7.

The potential (potential at point P1) applied to the gate terminal of the PMOS transistor M11 becomes 0 V. Potential 1 applied to the source terminal of the PMOS transistor M11 is equal to 3.6 V, so the gate-source voltage of the PMOS transistor M11 becomes equal to the difference between 3.6 V and 0 V, which is 3.6 V (3.6 V−0 V=3.6 V). This exceeds the threshold voltage Vt, which is equal to 0.8 V, so the PMOS transistor M11 switches on and the output signal OUT outputs the level of potential 1.

The potential (potential at point P2) applied to the gate terminal of the PMOS transistor M12 becomes a value equal to the difference between potential 1 and the forward voltage of the diode D12, so P2=3.6 V−0.7 V=2.9 V. Potential 2 applied to the source terminal of the PMOS transistor M12 is equal to 7.2 V, so the gate-source voltage of the PMOS transistor M12 becomes equal to the difference between 7.2 V and 2.9 V, which is 4.3 V (7.2 V−2.9 V=4.3 V). This exceeds the threshold voltage Vt, which is equal to 0.8 V, so the PMOS transistor M12 switches on and the output signal OUT outputs the level of potential 2.

The potential (potential at point P3) applied to the gate terminal of the PMOS transistor M13 becomes a value equal to the difference between potential 2 and the forward voltage of the diode D13, so P3=7.2 V−0.7 V=6.5 V. Potential 3 applied to the source terminal of the PMOS transistor M13 is equal to 10.8 V, so the gate-source voltage of the PMOS transistor M13 becomes equal to the difference between 10.8 V and 6.5 V, which is 4.3 V (10.8 V−6.5 V=4.3 V). This exceeds the threshold voltage Vt, which is equal to 0.8 V, so the PMOS transistor M13 switches on and the output signal OUT outputs the level of potential 3.

The potential (potential at point P4) applied to the gate terminal of the PMOS transistor M14 becomes a value equal to the difference between potential 3 and the forward voltage of the diode D14, so P4=10.8 V−0.7 V=10.1 V. Potential 4 applied to the source terminal of the PMOS transistor M14 is equal to 14.4 V, so the gate-source voltage of the PMOS transistor M14 becomes equal to the difference between 14.4 V and 10.1 V, which is 4.3 V (14.4 V−10.1 V=4.3 V). This exceeds the threshold voltage Vt, which is equal to 0.8 V, so the PMOS transistor M14 switches on and the output signal OUT outputs the level of potential 4.

The potential (potential at point P5) applied to the gate terminal of the PMOS transistor M15 becomes a value equal to the difference between potential 4 and the forward voltage of the diode D15, so P5=14.4 V−0.7 V=13.7 V. Potential 5 applied to the source terminal of the PMOS transistor M15 is equal to 18.0 V, so the gate-source voltage of the PMOS transistor M15 becomes equal to the difference between 18.0 V and 13.7 V, which is 4.3 V (18.0 V−13.7 V=4.3 V). This exceeds the threshold voltage Vt, which is equal to 0.8 V, so the PMOS transistor M15 switches on and the output signal OUT outputs the level of potential 5.

In this case, there is no voltage detection circuit 20 (201 to 205) whose output signal OUT is the GND level, so the processing circuit 22 determines that the battery voltages of the battery cells in the battery cell group 12 exceed the charging prohibition voltage and the charging prohibition operation is not performed.

Next, a case where the battery voltage of each battery cell in the battery cell group 12 has dropped significantly will be described. Here, the operation of the voltage detection circuits 20 (201 to 205) in a case where the battery voltages of the battery cells have all dropped to 0.6 V will be described with reference to the schematic diagram of FIG. 8.

The potential at point P1 applied to the gate terminal of the PMOS transistor M11 becomes 0 V. Potential 1 applied to the source terminal of the PMOS transistor M11 is equal to 0.6 V, so the gate-source voltage of the PMOS transistor M11 becomes equal to the difference between 0.6 V and 0 V, which is 0.6 V (0.6 V−0 V=0.6 V). This is equal to or less than the threshold voltage Vt, which is equal to 0.8 V, so the PMOS transistor M11 switches off and the output signal OUT outputs the GND level.

The potential at point P2 applied to the gate terminal of the PMOS transistor M12 becomes a value equal to the difference between potential 1 and the forward voltage of the diode D12, so it becomes 0 V. Potential 2 applied to the source terminal of the PMOS transistor M12 is equal to 1.2 V, so the gate-source voltage of the PMOS transistor M12 becomes equal to the difference between 1.2 V and 0 V, which is 1.2 V (1.2 V−0 V=1.2 V). This exceeds the threshold voltage Vt, which is equal to 0.8 V, so the PMOS transistor M12 switches on and the output signal OUT outputs the level of potential 2.

The potential at point P3 applied to the gate terminal of the PMOS transistor M13 becomes a value equal to the difference between potential 2 and the forward voltage of the diode D13, so P3=1.2 V−0.7 V=0.5 V. Potential 3 applied to the source terminal of the PMOS transistor M13 is equal to 1.8 V, so the gate-source voltage of the PMOS transistor M13 becomes equal to the difference between 1.8 V and 0.5 V, which is 1.3 V (1.8 V−0.5 V=1.3 V). This exceeds the threshold voltage Vt, which is equal to 0.8 V, so the PMOS transistor M13 switches on and the output signal OUT outputs the level of potential 3.

The potential at point P4 applied to the gate terminal of the PMOS transistor M14 becomes a value equal to the difference between potential 3 and the forward voltage of the diode D14, so P4=1.8 V−0.7 V=1.1 V. Potential 4 applied to the source terminal of the PMOS transistor M14 is equal to 2.4 V, so the gate-source voltage of the PMOS transistor M14 becomes equal to the difference between 2.4 V and 1.1 V, which is 1.3 V (2.4 V−1.1 V=1.3 V). This exceeds the threshold voltage Vt, which is equal to 0.8 V, so the PMOS transistor M14 switches on and the output signal OUT outputs the level of potential 4.

The potential at point P5 applied to the gate terminal of the PMOS transistor M15 becomes a value equal to the difference between potential 4 and the forward voltage of the diode D15, so P5=2.4 V−0.7 V=1.7 V. Potential 5 applied to the source terminal of the PMOS transistor M15 is equal to 3.0 V, so the gate-source voltage of the PMOS transistor M15 becomes equal to the difference between 3.0 V and 1.7 V, which is 1.3 V (3.0 V−1.7 V=1.3 V). This exceeds the threshold voltage Vt, which is equal to 0.8 V, so the PMOS transistor M15 switches on and the output signal OUT outputs the level of potential 5.

In this case, the processing circuit 22 detects that there is one voltage detection circuit 20 whose output signal OUT is the GND level. In a case where the charging prohibition voltage is set to 0.6 V, the processing circuit 22 determines to prohibit the charging operation of the battery cell group 12 when there is one voltage detection circuit 20 whose output signal OUT is the GND level in this way, whereby charging can be prohibited.

Next, a case where the battery voltage of each battery cell in the battery cell group 12 has dropped even more will be described. Here, the operation of the voltage detection circuits 20 (201 to 205) in a case where the battery voltages of the battery cells have all dropped to 0.4 V will be described with reference to the schematic diagram of FIG. 9.

The potential at point P1 applied to the gate terminal of the PMOS transistor M11 becomes 0 V. Potential 1 applied to the source terminal of the PMOS transistor M11 is equal to 0.4 V, so the gate-source voltage of the PMOS transistor M11 becomes equal to the difference between 0.4 V and 0 V, which is 0.4 V (0.4 V−0 V=0.4 V). This is equal to or less than the threshold voltage Vt, which is equal to 0.8 V, so the PMOS transistor M11 switches off and the output signal OUT outputs the GND level.

The potential at point P2 applied to the gate terminal of the PMOS transistor M12 becomes a value equal to the difference between potential 1 and the forward voltage of the diode D12, so it becomes 0 V. Potential 2 applied to the source terminal of the PMOS transistor M12 is equal to 0.8 V, so the gate-source voltage of the PMOS transistor M12 becomes equal to the difference between 0.8 V and 0 V, which is 0.8 V (0.8 V−0 V=0.8 V). This is equal to or less than the threshold voltage Vt, which is equal to 0.8 V, so the PMOS transistor M12 switches off and the output signal OUT outputs the GND level.

The potential at point P3 applied to the gate terminal of the PMOS transistor M13 becomes a value equal to the difference between potential 2 and the forward voltage of the diode D13, so P3=0.8 V−0.7 V=0.1 V. Potential 3 applied to the source terminal of the PMOS transistor M13 is equal to 1.2 V, so the gate-source voltage of the PMOS transistor M13 becomes equal to the difference between 1.2 V and 0.1 V, which is 1.1 V (1.2 V−0.1 V=1.1 V). This exceeds the threshold voltage Vt, which is equal to 0.8 V, so the PMOS transistor M13 switches on and the output signal OUT outputs the level of potential 3.

The potential at point P4 applied to the gate terminal of the PMOS transistor M14 becomes a value equal to the difference between potential 3 and the forward voltage of the diode D14, so P4=1.2 V−0.7 V=0.5 V. Potential 4 applied to the source terminal of the PMOS transistor M14 is equal to 1.6 V, so the gate-source voltage of the PMOS transistor M14 becomes equal to the difference between 1.6 V and 0.5 V, which is 1.1 V (1.6 V−0.5 V=1.1 V). This exceeds the threshold voltage Vt, which is equal to 0.8 V, so the PMOS transistor M14 switches on and the output signal OUT outputs the level of potential 4.

The potential at point P5 applied to the gate terminal of the PMOS transistor M15 becomes a value equal to the difference between potential 4 and the forward voltage of the diode D15, so P5=1.6 V−0.7 V=0.9 V. Potential 5 applied to the source terminal of the PMOS transistor M15 is equal to 2.0 V, so the gate-source voltage of the PMOS transistor M15 becomes equal to the difference between 2.0 V and 0.9 V, which is 1.1 V (2.0 V−0.9 V=1.1 V). This exceeds the threshold voltage Vt, which is equal to 0.8 V, so the PMOS transistor M15 switches on and the output signal OUT outputs the level of potential 5.

In this case, the processing circuit 22 detects that there are two voltage detection circuits 20 whose output signal OUT is the GND level. In a case where the charging prohibition voltage is set to 0.4 V, the processing circuit 22 determines to prohibit the charging operation of the battery cell group 12 when there are two voltage detection circuits 20 whose output signal OUT is the GND level in this way, whereby charging can be prohibited.

Further, a case where the battery voltage of each battery cell in the battery cell group 12 has dropped even more will be described. Here, the operation of the voltage detection circuits 20 (201 to 205) in a case where the battery voltages of the battery cells have all dropped to 0.2 V will be described with reference to the schematic diagram of FIG. 10.

The potential at point P1 applied to the gate terminal of the PMOS transistor M11 becomes 0 V. Potential 1 applied to the source terminal of the PMOS transistor M11 is equal to 0.2 V, so the gate-source voltage of the PMOS transistor M11 becomes equal to the difference between 0.2 V and 0 V, which is 0.2 V (0.2 V−0 V=0.2 V). This is equal to or less than the threshold voltage Vt, which is equal to 0.8 V, so the PMOS transistor M11 switches off and the output signal OUT outputs the GND level.

The potential at point P2 applied to the gate terminal of the PMOS transistor M12 becomes a value equal to the difference between potential 1 and the forward voltage of the diode D12, so it becomes 0 V. Potential 2 applied to the source terminal of the PMOS transistor M12 is equal to 0.4 V, so the gate-source voltage of the PMOS transistor M12 becomes equal to the difference between 0.4 V and 0 V, which is 0.4 V (0.4 V−0 V=0.4 V). This is equal to or less than the threshold voltage Vt, which is equal to 0.8 V, so the PMOS transistor M12 switches off and the output signal OUT outputs the GND level.

The potential at point P3 applied to the gate terminal of the PMOS transistor M13 becomes a value equal to the difference between potential 2 and the forward voltage of the diode D13, so it becomes 0 V. Potential 3 applied to the source terminal of the PMOS transistor M13 is equal to 0.6 V, so the gate-source voltage of the PMOS transistor M13 becomes equal to the difference between 0.6 V and 0 V, which is 0.6 V (0.6 V−0 V=0.6 V). This is equal to or less than the threshold voltage Vt, which is equal to 0.8 V, so the PMOS transistor M13 switches off and the output signal OUT outputs the GND level.

The potential at point P4 applied to the gate terminal of the PMOS transistor M14 becomes a value equal to the difference between potential 3 and the forward voltage of the diode D14, so it becomes 0 V. Potential 4 applied to the source terminal of the PMOS transistor M14 is equal to 0.8 V, so the gate-source voltage of the PMOS transistor M14 becomes equal to the difference between 0.8 V and 0 V, which is 0.8 V (0.8 V−0 V=0.8 V). This is equal to or less than the threshold voltage Vt, which is equal to 0.8 V, so the PMOS transistor M14 switches off and the output signal OUT outputs the GND level.

The potential at point P5 applied to the gate terminal of the PMOS transistor M15 becomes a value equal to the difference between potential 4 and the forward voltage of the diode D15, so P5=0.8 V−0.7 V=0.1 V. Potential 5 applied to the source terminal of the PMOS transistor M15 is equal to 1.0 V, so the gate-source voltage of the PMOS transistor M15 becomes equal to the difference between 1.0 V and 0.1 V, which is 0.9 V (1.0 V−0.1 V=0.9 V). This exceeds the threshold voltage Vt, which is equal to 0.8 V, so the PMOS transistor M15 switches on and the output signal OUT outputs the level of potential 5.

In this case, the processing circuit 22 detects that there are four voltage detection circuits 20 whose output signal OUT is the GND level. In a case where the charging prohibition voltage is set to 0.2 V, the processing circuit 22 determines to prohibit the charging operation of the battery cell group 12 when there are four voltage detection circuits 20 whose output signal OUT is the GND level in this way, whereby charging can be prohibited.

Figure 11:
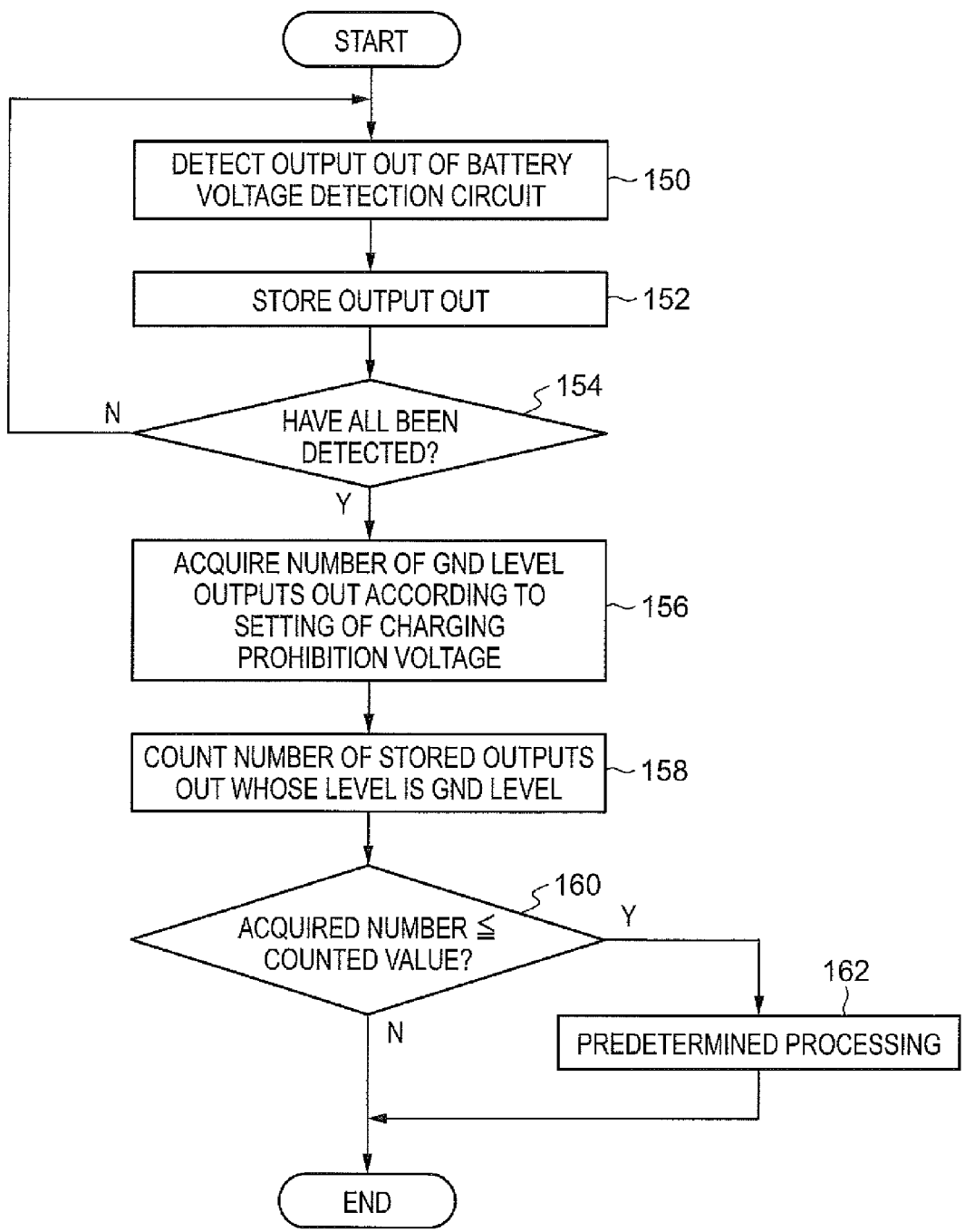
FIG. 11 is a flowchart showing an example of a flow of a charging prohibition determination operation that prohibits charging of the battery cell group pertaining to the third embodiment.

FIG. 11 shows an example of a flow of a charging prohibition determination operation that prohibits charging of the battery cell group 12 in accordance with the number of output signals OUT outputting the GND level that is predetermined in accordance with the charging prohibition voltage in this way.

Steps 150, 152, and 154 of the charging prohibition determination operation shown in FIG. 11 correspond respectively to steps 100, 102, and 104 of the charging prohibition determination operation of the first embodiment (see FIG. 4). That is, the processing circuit 22 performs, with respect to all of the voltage detection circuits 20 (201 to 205), the processing of detecting and storing the output signals OUT of the voltage detection circuits 20 and thereafter advances to step 156.

In step 156, the processing circuit 22 acquires the number of GND level output signals OUT according to the setting of the charging prohibition voltage. A predetermined value (fixed value) may be set beforehand for the charging prohibition voltage, or the charging prohibition voltage may be set arbitrarily in accordance with the condition of use and so forth of the battery cell group 12. It suffices for the correspondence relationship between the charging prohibition voltage and the number of GND level output signals OUT to be stored beforehand in a storage unit (memory) not shown in the drawings. For example, in the cases described above, the processing circuit 22 acquires a number of output signals OUT equal to 1 in a case where the charging prohibition voltage is equal to 0.6 V, the processing circuit 22 acquires a number of output signals OUT equal to 2 in a case where the charging prohibition voltage is equal to 0.4 V, and the processing circuit 22 acquires a number of output signals OUT equal to 4 in a case where the charging prohibition voltage is equal to 0.2 V.

In the next step 158, the number of output signals OUT stored in step 152 that indicate the GND level is counted. In the next step 160, it is judged whether or not the acquired number acquired in step 156 is equal to or less than the counted value counted in step 158. In a case where the answer is NO, the battery voltage of each battery cell in the battery cell group 12 exceeds the charging prohibition voltage, so the processing ends. On the other hand, in a case where the answer is YES, the battery voltage of each battery cell in the battery cell group 12 is equal to or less than the charging prohibition voltage, so the processing advances to step 162, the predetermined processing for prohibiting charging like in step 108 of the charging prohibition determination operation of the first embodiment (see FIG. 4) is performed, and thereafter the processing ends.

As described above, in the charging prohibition determination operation of the present embodiment, by detecting the number of output signals OUT outputting the GND level, whether or not the battery voltages of the battery cells in the battery cell group 12 are equal to or less than the charging prohibition voltage can be determined. Further, charging of the battery cell group 12 can be prohibited in accordance with the number of output signals OUT outputting the GND level that is predetermined in accordance with the charging prohibition voltage, so the charging prohibition voltage can be set arbitrarily.

In the first, second, and third embodiments described above, it is assumed that a high voltage is applied to the PMOS transistor M1 of the voltage detection circuit of the battery cell of the upper (high potential) side, but in this case, it suffices to configure the voltage detection circuit so as to use a high pressure-resistant PMOS transistor.

In the first, second, and third embodiments described above, the processing circuit 22 is disposed inside the same semiconductor circuit 14 as the voltage detection circuits 20 and 30, but the present invention is not limited to this. The processing circuit 22 may also be formed in another circuit (on a chip). Further, likewise, the charging circuit 16 may also be disposed outside the battery monitoring system 10.

Further, in the first, second, and third embodiments described above, a case where the voltage detection circuit is disposed for each battery cell in the battery cell group 12 has been described in detail, but the present invention is not limited to this. For example, one voltage detection circuit may also be disposed respect to the battery cell group 12, and the voltage detection circuit may be appropriately connected by a switching element or the like to the battery cell whose voltage one wishes to detect.

Figure 12:
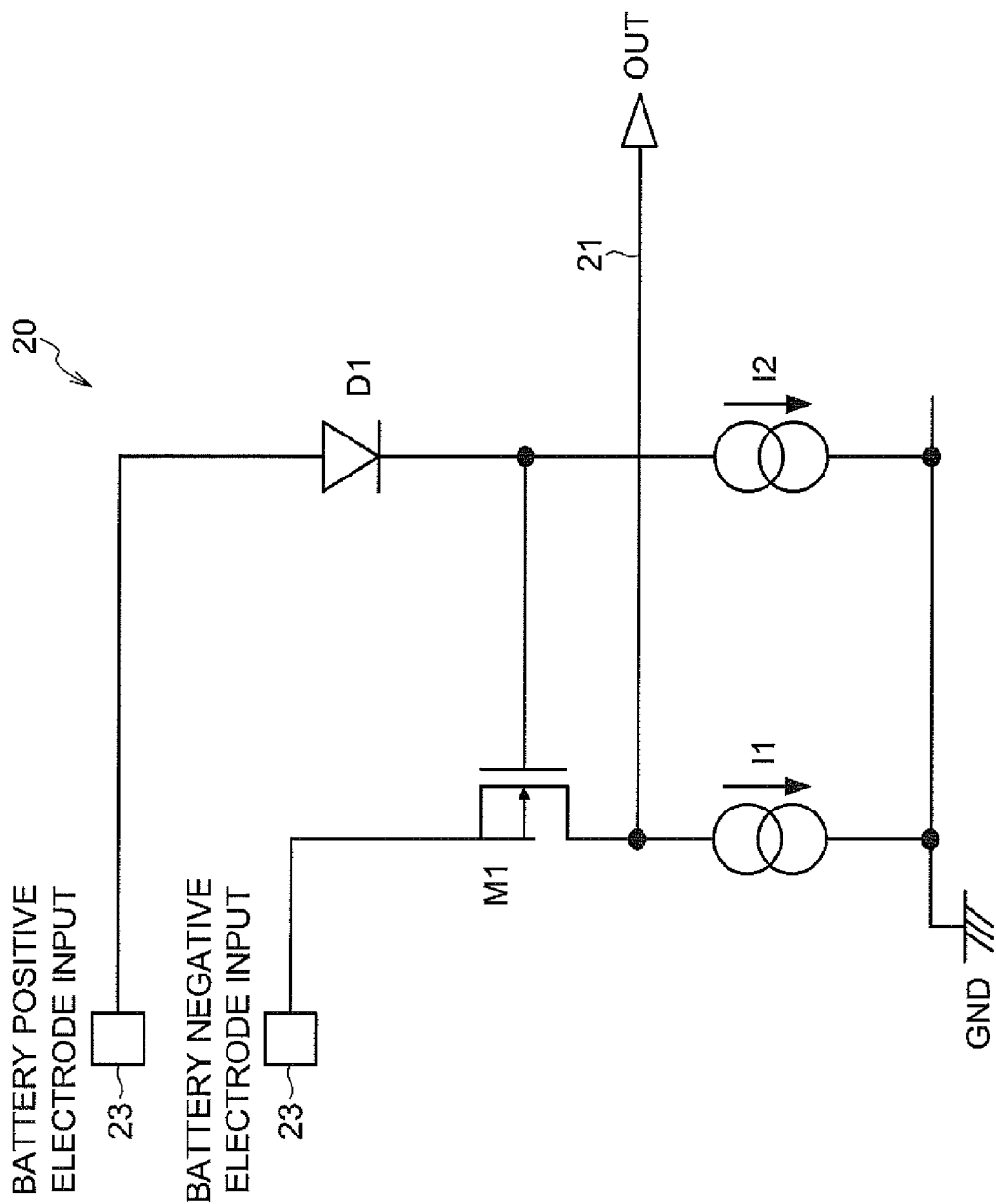
FIG. 12 is a circuit diagram showing another example of the schematic configuration of the voltage detection circuit pertaining to the first embodiment.

Further, in the first, second, and third embodiments described above, a PMOS transistor is used as the switching element, but the present invention is not limited to this. For example, a PNP transistor may also be used as the switching element. Further, for example, an NMOS transistor or an NPN transistor may also be used as the switching element. As an example in this case, FIG. 12 shows a case where an NMOS transistor is used as the switching element in the first embodiment. In the voltage detection circuit 20 shown in FIG. 12, the drain terminal of the NMOS transistor M1 serving as the switching element is connected to the negative electrode (low potential) side of the battery cell, and the source terminal of the NMOS transistor M1 is connected to the constant current source I1. Further, the gate terminal of the NMOS transistor M1 is connected between the diode D1 and the constant current source I2. Further, the diode D1 that regulates the voltage applied to the gate terminal of the NMOS transistor M1 is disposed on the positive electrode (high potential) side of the battery cell. Further, the output signal line 21 for outputting the output signal OUT is connected between the NMOS transistor M1 and the constant current source I1. Like in the first embodiment, by regulating the voltage applied to the control terminal of the NMOS transistor M1, the gate-source voltage can be regulated and a low voltage of the battery cell can be detected regardless of the threshold voltage Vt.

The transistor used as the switching element operates so as to switch from off to on in a case where the gate-source voltage exceeds the threshold voltage Vt, so configuring the detection circuit 20 in such a way that the source side of the transistor (switching element) is connected to the positive electrode (high potential) side or the negative electrode (low potential) side of the battery cell is preferred. For that reason, using a PMOS transistor for the switching element like in the first, second, and third embodiments is preferred. From the standpoint of manufacturing costs, using a PMOS transistor is preferred.

Further, the configuration and operation of the voltage detection circuits described in the first, second, and third embodiments, the diode D1 used for regulating the voltage in the first embodiment, and the resistive element R1 used for regulating the voltage in the second embodiment are examples and, it goes without saying, may be changed in accordance with the situation without departing from the gist of the present invention. For example, it suffices for the diode D1 in the first embodiment to regulate the voltage by lowering the voltage applied from the negative electrode (low potential) side of the battery cell, and the diode D1 in the first embodiment may also be a resistive element. In the first embodiment, the voltage can be lowered by the constant forward voltage, so using a diode is preferred. Further, for example, the resistive element R1 in the second embodiment also likewise regulates the voltage by lowering the voltage applied from the negative electrode (low potential) side of the battery cell and may also be a diode. The voltage drop amount can be changed in accordance with the flowing current, so using a resistive element is preferred.

Embodiments of the present invention are described above, but the present invention is not limited to the embodiments as will be clear to those skilled in the art.

What is claimed is:

1. A comparator circuit comprising:
   a switching element having a first terminal connected to a positive electrode of a battery cell, a second terminal connected to a first fixed potential supply source, and a control terminal that controls conduction between the first terminal and the second terminal in response to an applied voltage;
   a voltage regulating unit that has one end connected to a negative electrode of the battery cell, and another end connected to the control terminal and to a second fixed potential supply source, and that regulates the applied voltage from the battery cell to the switching element; and
   an output signal line connected to a connecting portion of the second terminal and the first fixed potential supply source.

2. The comparator circuit according to claim 1, further comprising:
   a first constant current source having one end connected to a connecting portion of the control terminal and the another end of the voltage regulating unit, and another end connected to the second fixed potential supply source; and
   a second constant current source having one end connected to a connecting portion of the second terminal and the output signal line, and another end connected to the first fixed potential supply source.

3. The comparator circuit according to claim 2, wherein the first fixed potential supply electrode and the second fixed potential supply electrode supply a same potential.

4. The comparator circuit according to claim 2, wherein the voltage regulating unit is a resistor that lowers the applied voltage from the battery cell to the control terminal.

5. The comparator circuit according to claim 4, wherein the resistor is a diode having an anode that is connected to the negative electrode of the battery cell and a cathode that is connected to the control terminal of the switching element.

6. A semiconductor device comprising:
   the comparator circuit according to claim 1; and
   a processing circuit that performs processing that prohibits charging of the battery cell in a case in which a potential output from the output signal line of the comparator circuit is a potential of the first fixed potential supply source.

7. The semiconductor device according to claim 6, wherein the comparator circuit is respectively provided for each battery cell of a plurality of battery cells.

8. The semiconductor device according to claim 6, wherein the comparator circuit is respectively provided for each battery cell in the plurality of battery cells.

9. A battery monitoring system comprising:
   a plurality of battery cells connected in series;
   a semiconductor device comprising the comparator circuit according to claim 1, the comparator circuit comparing a voltage of a high potential side and a voltage of a low potential side of the battery cells; and
   a charging circuit that charges the plurality of battery cells.

10. A comparator circuit comprising:
    a switching element having a first terminal, a second terminal connected to a first fixed potential supply source, and a first control terminal that controls conduction of the first terminal and the second terminal in response to an applied voltage;
    a resistor having one end connected to the first terminal and another end connected to a positive electrode of a battery cell;
    an output signal line connected to a connecting portion of the second terminal and the first fixed potential supply source; and
    a transistor having a third terminal connected to a negative electrode of the battery cell, a fourth terminal connected to a second fixed potential supply source, and a second control terminal connected to the first control terminal and to a connecting portion of the fourth terminal and the second fixed potential supply source.

11. The comparator circuit according to claim 10, wherein the transistor is a PMOS transistor, the third terminal of the transistor being a source and the fourth terminal of the transistor being a drain.

12. The comparator circuit according to claim 10, further comprising:
    a first constant current source having one end connected to a connecting portion of the fourth terminal and the second fixed potential supply source, and another end connected to the second fixed potential supply source; and
    a second constant current source having one end connected to a connecting portion of the second terminal and the output signal line, and another end connected to the first fixed potential supply source.

13. The comparator circuit according to claim 12, wherein the first fixed potential supply electrode and the second fixed potential supply electrode supply a same potential.

* * * * *